United States Patent
Inoue et al.

(10) Patent No.: US 9,787,170 B2
(45) Date of Patent: Oct. 10, 2017

(54) POWER CONVERSION DEVICE

(71) Applicants: Sadayuki Inoue, Tokyo (JP); Hideki Kawano, Tokyo (JP)

(72) Inventors: Sadayuki Inoue, Tokyo (JP); Hideki Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 600 days.

(21) Appl. No.: 14/366,042

(22) PCT Filed: Sep. 26, 2012

(86) PCT No.: PCT/JP2012/074675
§ 371 (c)(1),
(2) Date: Jun. 17, 2014

(87) PCT Pub. No.: WO2013/121618
PCT Pub. Date: Aug. 22, 2013

(65) Prior Publication Data
US 2015/0001932 A1    Jan. 1, 2015

(30) Foreign Application Priority Data
Feb. 13, 2012   (JP) ................................ 2012-028467

(51) Int. Cl.
*G05F 1/67*      (2006.01)
*H02J 3/46*      (2006.01)
(Continued)

(52) U.S. Cl.
CPC ............... *H02M 1/00* (2013.01); *G05F 1/67* (2013.01); *H02J 3/32* (2013.01); *H02J 3/385* (2013.01);
(Continued)

(58) Field of Classification Search
CPC .... G05F 1/67; H01L 31/04; H02J 3/32; H02J 3/38; H02J 3/382; H02J 3/383;
(Continued)

(56) References Cited

U.S. PATENT DOCUMENTS 4,494,180 A * 1/1985 Streater ................... H02M 3/10
318/801
4,663,702 A * 5/1987 Tanaka ................ H02M 5/4505
363/65

(Continued)

FOREIGN PATENT DOCUMENTS

JP      2001-8383 A     1/2001
JP      2002-44869 A    2/2002
(Continued)

OTHER PUBLICATIONS

Office Action dated Jan. 6, 2015 in Japanese Patent Application No. 2014-500033 with partial English translation.
(Continued)

*Primary Examiner* — Levi Gannon
(74) *Attorney, Agent, or Firm* — Oblon, McClelland, Maier & Neustadt, L.L.P.

(57) ABSTRACT

Provided are a solar panel (1), a first DC/DC conversion circuit (13), a DC/AC conversion circuit (21) connected via a DC bus (25), a second DC/DC conversion circuit (17) for controlling bus voltage in the case of power outage, a first control section (14) having two kinds of control modes and controlling the first DC/DC conversion circuit (13), a second control section (18) for controlling the second DC/DC conversion circuit (17), and a third control section (22) for controlling the DC/AC conversion circuit (21). The second control section (18) controls bus voltage in the case of power
(Continued)

outage, and the first control section (14) switches the control mode based on information of the second control section (18).

12 Claims, 18 Drawing Sheets

(51) Int. Cl.
| | | |
|---|---|---|
| *H02J 7/35* | (2006.01) | |
| *H02M 1/10* | (2006.01) | |
| *H02M 7/42* | (2006.01) | |
| *H02M 1/00* | (2006.01) | |
| *H02J 3/32* | (2006.01) | |
| *H02M 7/48* | (2007.01) | |
| *H02J 3/38* | (2006.01) | |
| *H02J 7/00* | (2006.01) | |
| *H02M 3/02* | (2006.01) | |

(52) U.S. Cl.
CPC ...... *H02J 3/46* (2013.01); *H02J 7/00* (2013.01); *H02J 7/35* (2013.01); *H02M 1/10* (2013.01); *H02M 3/02* (2013.01); *H02M 7/42* (2013.01); *H02M 7/48* (2013.01); *H02M 2001/007* (2013.01); *Y02E 10/58* (2013.01); *Y02E 70/30* (2013.01); *Y10T 307/344* (2015.04); *Y10T 307/352* (2015.04); *Y10T 307/359* (2015.04)

(58) Field of Classification Search
CPC ...... H02J 3/385; H02J 3/46; H02J 7/00; H02J 7/35; H02M 1/00; H02M 1/10; H02M 3/02; H02M 7/42; H02M 7/48; H02M 2001/007; H02M 2001/0067; Y02E 10/56; Y02E 10/58; Y02E 70/30; Y10T 307/305; Y10T 307/344; Y10T 307/352; Y10T 307/359; Y10T 307/383
USPC ........................................ 307/16, 23–25, 28
See application file for complete search history.

(56) References Cited

U.S. PATENT DOCUMENTS

| | | | | |
|---|---|---|---|---|
| 2005/0110454 A1* | 5/2005 | Tsai | ............................ | G05F 1/67 320/101 |
| 2009/0067202 A1* | 3/2009 | Ichikawa | ............ | B60L 11/1868 363/79 |
| 2009/0091956 A1* | 4/2009 | Nocentini | ............. | H02M 3/156 363/65 |
| 2010/0026097 A1* | 2/2010 | Avrutsky | ................ | H02J 1/102 307/43 |
| 2010/0156186 A1* | 6/2010 | Kim | .................... | H01M 16/003 307/72 |
| 2011/0134668 A1* | 6/2011 | Cho | ........................... | G05F 1/67 363/78 |
| 2011/0140520 A1* | 6/2011 | Lee | ................... | H01L 31/02021 307/25 |
| 2011/0210614 A1* | 9/2011 | Min | ........................... | H02J 3/32 307/82 |
| 2011/0273130 A1* | 11/2011 | Lee | ..................... | H01M 10/465 320/101 |
| 2013/0088900 A1* | 4/2013 | Park | ........................ | H02J 9/062 363/71 |
| 2013/0293020 A1* | 11/2013 | Shim | ........................ | H02J 7/34 307/72 |

FOREIGN PATENT DOCUMENTS

| | | |
|---|---|---|
| JP | 2005-130572 A | 5/2005 |
| JP | 4641507 | 3/2011 |
| JP | 2002-354677 | 12/2012 |

OTHER PUBLICATIONS

International Search Report dated Dec. 11, 2012, in PCT/JP2012/074675, filed Sep. 26, 2012.

\* cited by examiner

POWER CONVERSION DEVICE

TECHNICAL FIELD

The present invention relates to a power conversion device for converting DC power obtained from natural energy such as solar power generation to AC power and supplying the AC power to a system, and particularly, to a power conversion device capable of efficiently obtaining power from natural energy when a system is in a power outage state.

BACKGROUND ART

In recent years, in order to reduce environmental load, a power generation system utilizing natural energy such as solar power generation, that does not emit carbon dioxide is spreading into homes. Upon power outage, such a power generation system can output the maximum power of 1500 W from a self-sustained operation outlet provided therein in advance.

In addition, in order to cope with power shortage or the like after Great East Japan Earthquake, a system having a storage battery, a system using an electric automobile as a storage battery, a system combining solar power generation and a storage battery, and the like are being developed.

For example, a conventional power feed system includes a first power receiving section 1 connected to a solar battery, a second power receiving section 2 connected to a storage battery, a first DC/DC converter 11 for transforming output voltage of the first power receiving section 1, and a second DC/DC converter 12 for transforming output voltage of the second power receiving section 2, and sets a difference between output voltages of the first and second DC/DC converters, thereby setting priority on the solar battery or the storage battery. In the case of power outage, output voltage of the second DC/DC converter 12 is set to be lower than output voltage of the first DC/DC converter 11, whereby power from the solar battery is preferentially supplied to a load (see, for example, Patent Document 1).

CITATION LIST

Patent Document

Patent Document 1: Japanese Patent No. 4641507 (paragraph [0021], etc.)

SUMMARY OF THE INVENTION

Problems to be Solved by the Invention

In the conventional power feed system, in the case of power outage, while power from the solar battery is preferentially supplied to a load, control for the solar battery is performed by voltage control.

Generally, in the voltage control, a voltage control range is set in advance based on a power-voltage characteristic of the solar battery. As the voltage control range, a range on the right side with respect to peak power, of the power-voltage characteristic having a mountain shape, is used. The lower limit voltage thereof is set at voltage separated by a certain margin from voltage that is a maximum output point.

Therefore, there is a problem that, in the case of power outage, the conventional power feed system which always performs voltage control cannot effectively use generated power of the solar battery.

The present invention has been made to solve the above problem, and an object of the present invention is to obtain a power conversion device that, when a system is in a power outage state, can efficiently obtain power from a solar battery and effectively use generated power of the solar battery.

Solution to the Problems

A power conversion device according to the present invention is a power conversion device for converting DC power from a distributed power supply and supplying the converted power to a system and a load, the power conversion device including: a first DC/DC conversion circuit for converting first DC voltage outputted from the distributed power supply to second DC voltage; a DC/AC conversion circuit connected to the first DC/DC conversion circuit via positive and negative DC buses, for converting DC voltage to desired AC voltage and outputting the desired AC voltage; a second DC/DC conversion circuit for controlling bus voltage between the DC buses at least when the system is in a power outage state; a first control section for drive-controlling the first DC/DC conversion circuit, the first control section having two kinds of control modes of a power control mode for deriving the maximum power of the distributed power supply and a voltage control mode for controlling bus voltage between the DC buses; a second control section for drive-controlling the second DC/DC conversion circuit; and a third control section for drive-controlling the DC/AC conversion circuit. The second control section drive-controls the second DC/DC conversion circuit, to control the bus voltage, when the system is in a power outage state, and the first control section switches the two kinds of control modes, based on control information of the second control section when the system is in a power outage state.

Effect of the Invention

Owing to the above configuration, the power conversion device according to the present invention, when a system is in a power outage state, can efficiently obtain power from a solar battery and effectively use generated power of the solar battery.

DESCRIPTION OF EMBODIMENTS

Embodiment 1

Figure 1:
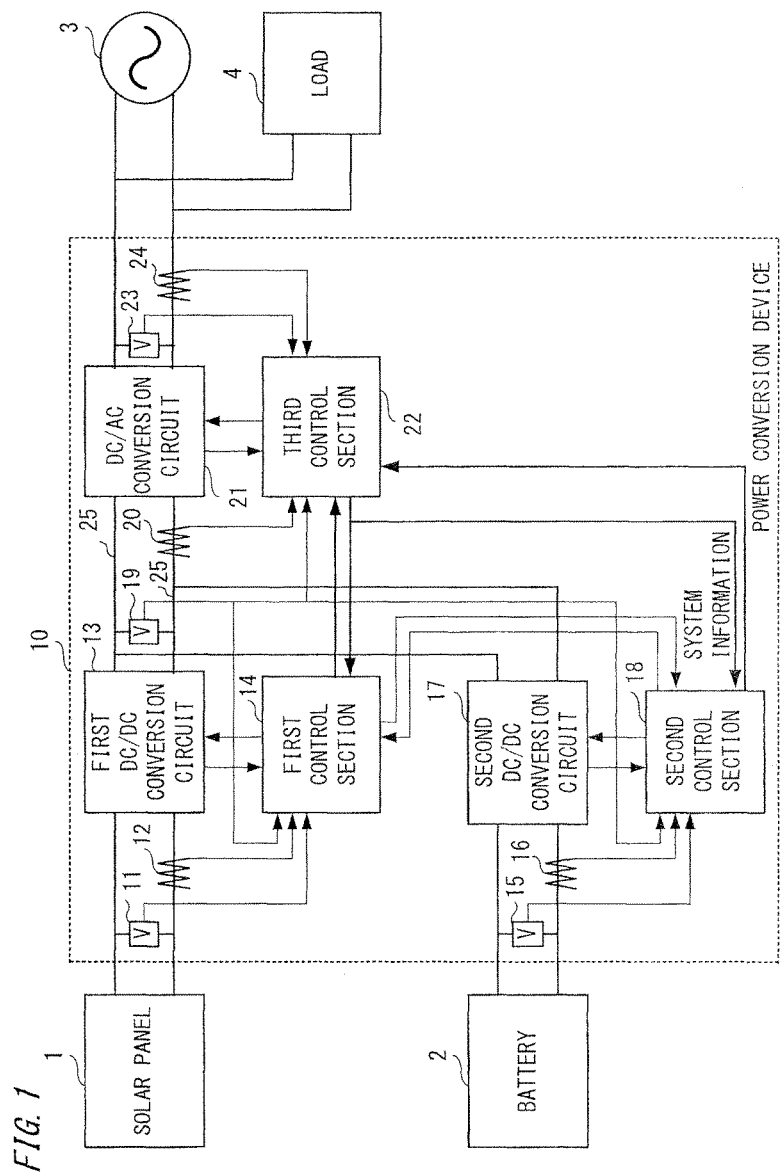
FIG. 1 is a schematic configuration diagram of a solar power generation system using a power conversion device according to embodiment 1 of the present invention.

FIG. 1 is a schematic configuration diagram of a solar power generation system using a power conversion device according to embodiment 1 of the present invention.

As shown in FIG. 1, a power conversion device 10 of the present embodiment 1 is provided between: a solar panel 1 which is a solar battery as a distributed power supply and a storage battery 2 as a power accumulating section; and a power system 3 as a system and a load 4 such as a refrigerator, an illumination, or a television placed in a home. For example, a stationary battery is used as the storage battery 2.

The power conversion device 10 includes a first DC/DC conversion circuit 13 connected to the solar panel 1, a DC/AC conversion circuit 21 connected to the first DC/DC conversion circuit 13 via positive and negative DC buses 25, and a second DC/DC conversion circuit 17 provided between the storage battery 2 and the DC buses 25. The first DC/DC conversion circuit 13, the second DC/DC conversion circuit 17, and the DC/AC conversion circuit 21 are connected to a first control section 14, a second control section 18, and a third control section 22, respectively, and thereby drive-controlled.

The first DC/DC conversion circuit 13 is drive-controlled by the first control section 14, thereby controlling DC power from the solar panel 1. The second DC/DC conversion circuit 17 is drive-controlled by the second control section 18, thereby controlling charging and discharging of the storage battery 2. In addition, as will be described later, the second DC/DC conversion circuit 17 controls bus voltage of the DC bus 25 when the power system 3 is in a power outage state. The DC/AC conversion circuit 21 is drive-controlled by the third control section 22, thereby converting DC voltage to desired AC voltage, and supplies the AC voltage to the power system 3 and the load 4. In addition, the DC/AC conversion circuit 21 can also convert AC power supplied from the power system 3 to DC power and charge the storage battery 2.

Between the solar panel 1 and the first DC/DC conversion circuit 13, a voltmeter 11 for measuring panel voltage of the solar panel 1 and an ammeter 12 for measuring current outputted from the solar panel 1 are provided. In addition, between the storage battery 2 and the second DC/DC conversion circuit 17, a voltmeter 15 for measuring battery voltage of the storage battery 2 and an ammeter 16 for measuring charge/discharge current of the storage battery 2 are provided. In addition, between the first DC/DC conversion circuit 13 and the DC/AC conversion circuit 21, a voltmeter 19 as a bus voltage measuring section for measuring bus voltage between the positive and negative DC buses 25, and an ammeter 20 for measuring current flowing in the DC bus 25 are provided. In addition, between the DC/AC conversion circuit 21 and the power system 3, a voltmeter 23 for measuring system voltage of the power system 3 and an ammeter 24 for measuring AC current flowing between the DC/AC conversion circuit 21 and the power system 3 are provided.

The first control section 14 drive-controls the first DC/DC conversion circuit, thereby controlling output from the solar panel 1. Hereinafter, the configuration of the first control section 14 will be described.

Figure 2:
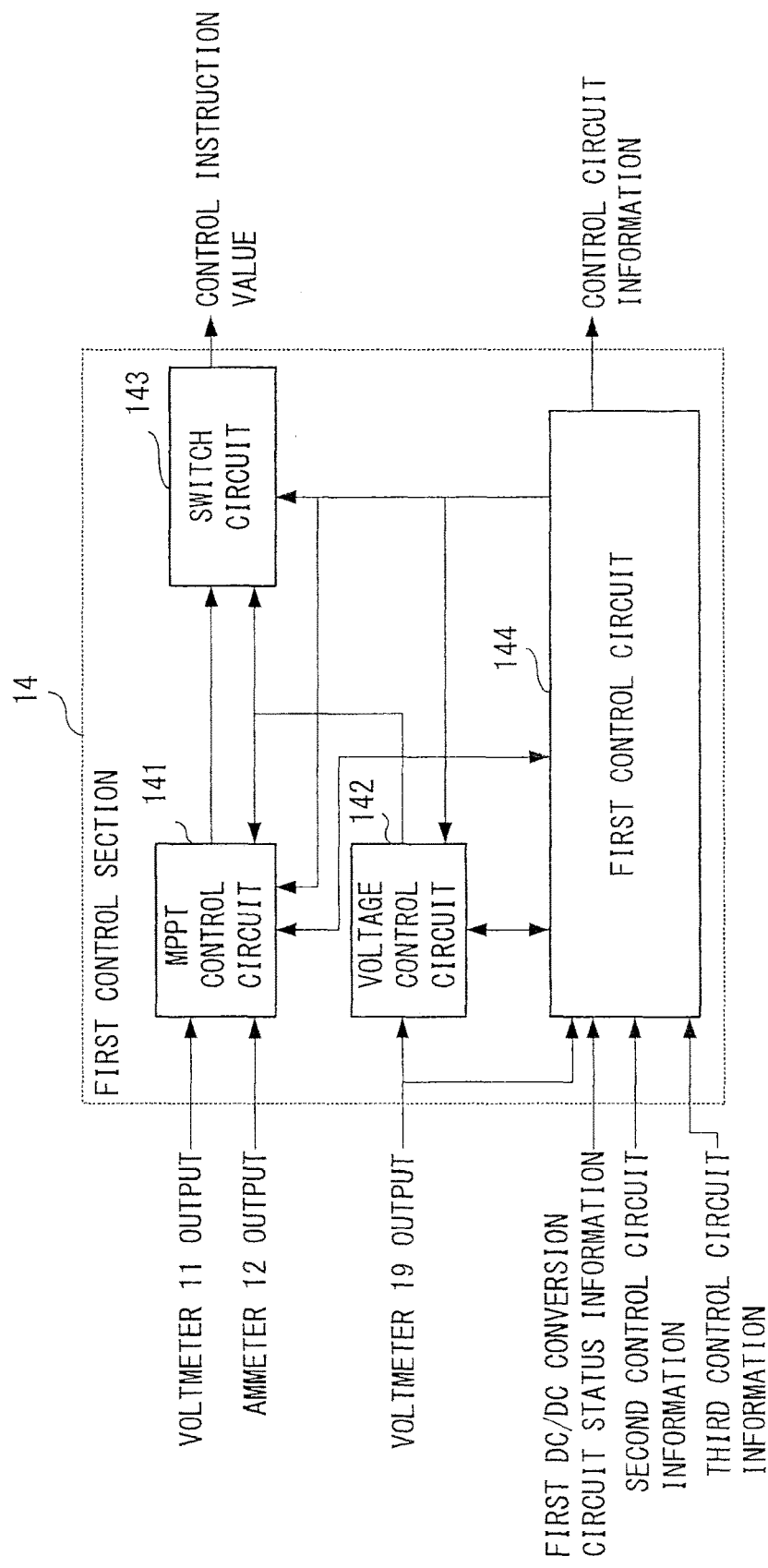
FIG. 2 is a block diagram schematically showing the configuration of a first control section according to embodiment 1 of the present invention.

FIG. 2 is a block diagram of the first control section 14.

The first control section 14 includes: an MPPT control circuit 141 for performing maximum power point tracking control (hereinafter, referred to as MPPT control) for deriving the maximum power of the solar panel 1; a voltage control circuit 142 for controlling output voltage of the solar panel 1, thereby controlling output power from the solar panel 1; a switch circuit 143 for performing switching between output of the MPPT control circuit 141 and output of the voltage control circuit 142; and a first control circuit 144 for controlling the MPPT control circuit 141, the voltage control circuit 142, and the switch circuit 143. The first control circuit 144 outputs a control parameter, a control target value, and the like to the MPPT control circuit 141 and the voltage control circuit 142, and manages the power generation status and the like of the solar panel 1. In addition, the first control circuit 144 outputs a control signal to the switch circuit 143.

Next, the configuration of the second control section 18 will be described. The second control section 18 drive-controls the second DC/DC conversion circuit, thereby controlling charging and discharging of the storage battery 2.

Figure 3:
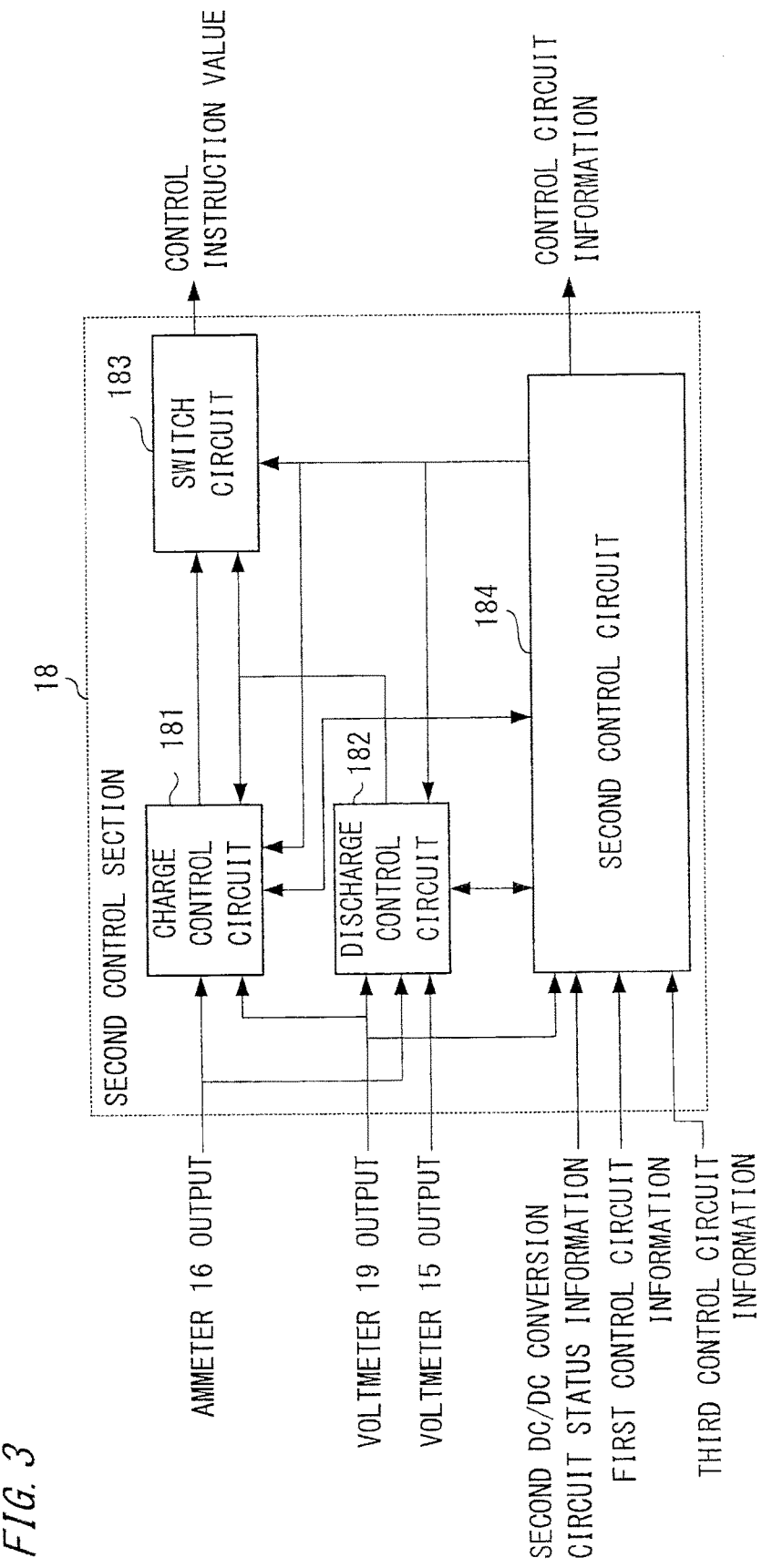
FIG. 3 is a block diagram schematically showing the configuration of a second control section according to embodiment 1 of the present invention.

FIG. 3 is a block diagram schematically showing the configuration of the second control section 18.

The second control section 18 includes: a charge control circuit 181 for calculating an instruction value in the case of performing charge control for the storage battery 2; a discharge control circuit 182 for calculating an instruction value in the case of performing discharge control for the storage battery 2; a switch circuit 183 for performing switching between output of the charge control circuit 181 and output of the discharge control circuit 182; and a second control circuit 184 for controlling the charge control circuit 181, the discharge control circuit 182, and the switch circuit 183. The second control circuit 184 outputs a control parameter, a control target value, and the like to the charge control circuit 181 and the discharge control circuit 182, and manages status information about the storage battery 2 such as the charge amount, charge current, and discharge power of the storage battery 2. In addition, the second control circuit 184 outputs a control signal to the switch circuit 183.

Here, two kinds of control modes of the first control section 14 described above, i.e., an MPPT control mode and a voltage control mode as power control modes will be briefly described with reference to FIG. 4.

Figure 4:
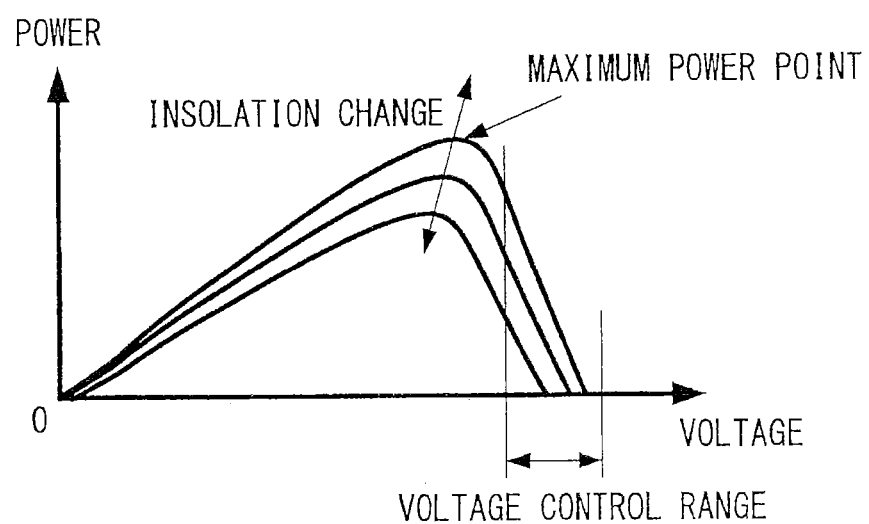
FIG. 4 is a diagram showing an example of a power-voltage characteristic of a solar panel according to embodiment 1 of the present invention.

FIG. 4 is a diagram showing an example of a power-voltage characteristic of the solar panel 1. The horizontal axis indicates panel voltage of the solar panel 1, and the vertical axis indicates generated power of the solar panel 1. Power-voltage characteristics in three cases different in the insolation amount and the temperature of the solar panel 1 are shown.

First, general MPPT control will be described.

As shown in FIG. 4, the power-voltage characteristic of the solar panel 1 varies depending on circumstances such as change in the insolation amount and temperature change, and therefore the maximum power point is shifted. Therefore, MPPT control always performs an operation of changing output voltage (operation voltage) of the solar panel 1 and then, based on increase or decrease in power due to the change, searching for a point where the maximum power is obtained, that is, optimum operation voltage, in order to derive the maximum power from the solar panel 1. A general searching operation for the maximum power point is referred to as a hill climbing method. First, operation voltage is increased by, for example, $\Delta V$, a power difference $\Delta P$ is calculated, and then, if $\Delta P > 0$, since the present voltage is considered to be present at the left (on the lower voltage side) of the maximum power point, voltage is changed in the same direction as that at the previous time. If $\Delta P < 0$, since the present voltage is considered to be present at the right (on the higher voltage side) of the maximum power point, voltage is changed in a direction opposite to that at the previous time. Thus, the maximum power point is searched for. As described above, in MPPT control, output power of the solar panel 1 is controlled to be maximized (so that output power of the solar panel 1 becomes the maximum power point shown in FIG. 1).

Next, the voltage control mode which is general voltage control will be described.

In the voltage control mode, a voltage control range is set in advance based on a power-voltage characteristic of the solar panel 1, and power of the solar panel 1 is derived in the voltage control range.

As shown in FIG. 4, the voltage control range in the voltage control mode is set on the right side of voltage that is the maximum power point of the power-voltage characteristic. If output voltage of the solar panel 1 becomes smaller than voltage (hereinafter, referred to as peak voltage) that is the maximum power point, generated power from the solar panel 1 starts to monotonously decrease, so that the subsequent voltage control fails. Therefore, the voltage control range is set such that output voltage of the solar panel 1 does not become equal to or smaller than the peak voltage. In addition, as shown in FIG. 4, the peak voltage of the power-voltage characteristic always varies depending on the circumstances of the solar panel 1. Therefore, in order to prevent output voltage of the solar panel 1 from becoming equal to or smaller than the peak voltage even if the circumstances change, the lower limit value of the voltage control range is set so as to be separated by a certain margin from the peak voltage of the power-voltage characteristic. The voltage control mode controls output voltage of the solar panel 1 within the voltage control range as described above, thereby deriving power.

While the voltage control mode sets the lower limit value of the voltage control range to be separated by a certain margin from the peak voltage of the power-voltage characteristic, the MPPT control mode always searches for the peak voltage such that generated power is maximized. Therefore, by controlling the solar panel 1 by the MPPT control mode, it is possible to more efficiently obtain generated power from the solar panel 1.

Hereinafter, "control in the MPPT control mode" may be referred to as "MPPT control" and "control in the voltage control mode" may be referred to as "voltage control", as necessary.

Next, the detailed operation of the power conversion device 10 will be described.

First, a normal operation in which power is normally supplied to the power system 3 will be described.

First, with reference to FIGS. 1 and 2, an operation relevant to the solar panel 1, of the power conversion device 10 in a normal operation will be described.

In a normal operation of the power conversion device 10, the first control section 14 confirms whether or not power is generated by the solar panel 1. Specifically, the first control section 14 confirms whether or not a measured value of the voltmeter 11 which measures panel voltage of the solar panel 1 is greater than a predetermined value. It is noted that the predetermined value is set in advance as a value that allows power generation by the solar panel 1. If the measured value of panel voltage is greater than the predetermined value, the first control section 14 reports to the third control section 22 that power generation by the solar panel 1 is possible. When having received the report, the third control section 22 confirms that the power system 3 is not in a power outage state. If the power system 3 is not in a power outage state, the third control section 22 activates the DC/AC conversion circuit 21 and instructs the first control section 14 to start power generation of the solar panel 1. By the activation of the DC/AC conversion circuit 21, bus voltage between the positive and negative DC buses 25 is controlled to be predetermined control target voltage. In addition, power regenerated to the power system 3 causes the entire system to operate through current control of the DC/AC conversion circuit 21. It is noted that an operation of confirming that the power system 3 is not in a power outage state will be described later in detail.

The instruction from the third control section 22 to start power generation of the solar panel 1 is received by the first control circuit 144 in the first control section 14. When having received the power generation start instruction, the first control circuit 144 instructs the MPPT control circuit 141 to start MPPT control for the solar panel 1. At this time, the first control circuit 144 also instructs the switch circuit 143 to select output of the MPPT control circuit 141. When having received the MPPT control start instruction, the MPPT control circuit 141 outputs a control instruction to the first DC/DC conversion circuit 13. The control instruction from the MPPT control circuit 141 is inputted to the first DC/DC conversion circuit 13 via the switch circuit 143. The first DC/DC conversion circuit 13 controls a step-up circuit provided therein, based on the instruction value, to convert first DC voltage V1 outputted from the solar panel 1 to second DC voltage V2, and outputs the second DC voltage V2.

When supply of power generated by the solar panel 1 from the first DC/DC conversion circuit 13 is started, the DC/AC conversion circuit 21 is drive-controlled by the third control section 22, thereby outputting power from the solar panel 1 to the power system 3 and the load 4. It is noted that output (regenerating) of power from the solar panel 1 to the power system 3 is determined by the third control section 22. Specifically, the third control section 22 monitors bus voltage between the positive and negative DC buses 25 via the voltmeter 19 which measures the bus voltage, and the DC/AC conversion circuit 21 is controlled such that, when the measured value of the bus voltage has become greater than the control target voltage, power is regenerated to the power system 3 in synchronization with an AC voltage waveform supplied from the power system 3.

Next, with reference to FIGS. 1 and 3, an operation relevant to the storage battery 2, of the power conversion device 10 in a normal operation will be described.

The third control section 22 performs an instruction for charging and discharging of the storage battery 2. For example, when having received a request to transmit status information about the storage battery 2 from a power management system (HOME ENERGY MANAGEMENT SYSTEM) (hereinafter, referred to as HEMS) in a home, which is not shown, the third control section 22 acquires the status information from the second control circuit 184 in the second control section 18 which manages status information such as whether or not charging or discharging can be performed and the stored power amount which are the status information about the storage battery 2. When having acquired the status information about the storage battery 2, the third control section 22 reports, to the HEMS, a result of the determination about whether or not discharging or charging can be performed, and the maximum discharge power or the maximum charge power. The HEMS issues, to the third control section 22, a discharge instruction for the storage battery 2 (including a discharge power instruction value) or a charge instruction for the storage battery 2 (including a charge power instruction value), based on the received status information.

First, the case where a discharge instruction is issued from the HEMS will be described.

When having received the issued discharge instruction, the third control section 22 issues an instruction to start discharging of the storage battery 2 and reports the discharge power instruction value, to the second control section 18.

The discharge start instruction from the third control section 22 is received by the second control circuit 184 in the second control section 18. When having received the discharge start instruction and the discharge power instruction value for the storage battery 2, the second control circuit 184 outputs the discharge start instruction and the discharge power instruction value for the storage battery 2 to the discharge control circuit 182. At this time, the second control circuit 184 also instructs the switch circuit 183 to select output of the discharge control circuit 182. When having received the discharge start instruction, the discharge control circuit 182 calculates actual discharge power from the storage battery 2 based on voltage information obtained by the voltmeter 15 which measures battery voltage of the storage battery 2 and current information obtained by the ammeter 16 which measures charge/discharge current of the storage battery 2. The discharge control circuit 182 outputs a control instruction to the second DC/DC conversion circuit 17 so that the calculation result will become the received discharge power instruction value. The control instruction from the discharge control circuit 182 is inputted to the second DC/DC conversion circuit 17 via the switch circuit 183. The second DC/DC conversion circuit 17 operates based on the control instruction, to convert third DC voltage V3 outputted from the storage battery 2 to fourth DC voltage V4, and outputs the fourth DC voltage V4. The output from the storage battery 2 converted to the fourth DC voltage V4 is supplied to the power system 3 and the load 4 via the DC/AC conversion circuit 21. Here, as in the above case of outputting (regenerating) power of the solar panel 1 to the power system 3, output (regeneration) of power from the storage battery 2 to the power system 3 is determined by the third control section 22. When the value of bus voltage measured by the voltmeter 19 has become greater than the control target voltage, the third control section 22 controls the DC/AC conversion circuit 21 so as to regenerate power to the power system 3.

It is noted that the discharge control circuit 182 obtains the value of discharge power actually outputted from the second DC/DC conversion circuit 17, as status information about the second DC/DC conversion circuit 17, and reports a result of the obtaining to the second control circuit 184. Based on the status information about the second DC/DC conversion circuit 17, the second control circuit 184 can obtain conversion loss in the second DC/DC conversion circuit 17, and perform discharge control for the storage battery 2 while adding an amount corresponding to the loss.

In addition, the status information about the second DC/DC conversion circuit 17 reported from the discharge control circuit 182 to the second control circuit 184, and the status information such as the charge amount, charge current, and discharge power of the storage battery 2 managed in the second control circuit 184, are periodically reported from the second control circuit 184 to the third control section 22.

On the other hand, the case where a charge instruction is issued from the HEMS will be described.

When having received the issued charge instruction, the third control section 22 issues an instruction to start charging of the storage battery 2 and reports a charge power (charge current) instruction value, to the second control section 18.

The charge start instruction from the third control section 22 is received by the second control circuit 184 in the second control section 18. When having received the charge start instruction and the charge power instruction value for the storage battery 2, the second control circuit 184 outputs the charge start instruction and the charge power instruction value for the storage battery 2 to the charge control circuit 181. At this time, the second control circuit 184 also instructs the switch circuit 183 to select output of the charge control circuit 181. When having received the charge start instruction, the charge control circuit 181 outputs a control instruction to the second DC/DC conversion circuit 17 so that charge current to the storage battery 2 becomes the charge power instruction value, based on current information obtained by the ammeter 16. The control instruction from the charge control circuit 181 is inputted to the second DC/DC conversion circuit 17 via the switch circuit 183. The second DC/DC conversion circuit 17 operates based on the control instruction, to charge the storage battery 2.

It is noted that in charging of the storage battery 2, generated power of the solar panel 1 is preferentially used for charging the storage battery 2. If the generated power of the solar panel 1 covers the whole charge power for the storage battery 2 and surplus power is still left, the surplus power is outputted to the power system 3 and the load 4. If the generated power of the solar panel 1 cannot cover the whole charge power for the storage battery 2, power corresponding to the deficiency is supplied from the power system 3. Specifically, the third control section 22 monitors bus voltage between the positive and negative DC buses 25 via the voltmeter 19 which measures the bus voltage, and if the measured value of bus voltage is smaller than the control target voltage, controls the DC/AC conversion circuit 21 so as to take running power into the power conversion device 10 from the power system 3.

In a normal operation, determination for outputting (re-generating) generated power from the solar panel 1 or discharge power from the storage battery 2 to the power system 3, and determination for taking (power-running) power into the power conversion device 10 from the power system 3 are performed based on a measured value of bus voltage between the positive and negative DC buses 25.

In a normal operation, besides instructions for charging and discharging of the storage battery 2 as described above, the third control section 22 detects whether or not the power system 3 is in a power outage state, to always confirm that the power system 3 is not in a power outage state. Hereinafter, detection of whether or not the power system 3 is in a power outage state is referred to as isolated operation detection.

In a normal operation, the third control section 22 performs the isolated operation detection from a measurement result by the voltmeter 23 which measures system voltage of the power system 3, a measurement result by the ammeter 24 which measures AC current flowing between the DC/AC conversion circuit 21 and the power system 3, and the phase of output power of the DC/AC conversion circuit 21 regenerated to the power system 3. The details of the isolated operation detection method are the same as those prescribed by Grid-interconnection code (JEAC9701-2010), so the detailed description thereof is omitted in the present embodiment 1.

If isolated operation has been detected in the isolated operation detection by the third control section 22 as described above, it is determined that some abnormality such as power outage has occurred in the power system 3, and the power conversion device 10 starts a self-sustained operation.

Hereinafter, operation of the power conversion device 10 when the power system 3 is in a power outage state will be described.

When having detected isolated operation, the third control section 22 instructs the first control section 14 and the second control section 18 to stop operations of the first DC/DC conversion circuit 13 and the second DC/DC conversion circuit 17. When having received the instructions, the first control section 14 and the second control section 18 stop operations of the first DC/DC conversion circuit 13 and the second DC/DC conversion circuit 17, and report the stoppage to the third control section 22. When having confirmed the stoppage of the first DC/DC conversion circuit 13 and the second DC/DC conversion circuit 17, the third control section 22 stops operation of the DC/AC conversion circuit 21.

Then, for example, automatically, a switch or the like (not shown) provided between the power system 3, and the power conversion device 10 and the load 4 in a home, is turned off, whereby connection between the power system 3, and the power conversion device 10 and the load 4 in a home, is disconnected.

Next, the third control section 22 instructs the second control section 18 to start discharging from the storage battery 2.

The discharge instruction from the third control section 22 to the second control section 18 is received by the second control circuit 184 in the second control section 18, and the second control circuit 184 confirms whether or not discharging from the storage battery 2 is possible and the allowable discharge power amount. If discharging from the storage battery 2 is possible, the second control circuit 184 outputs an instruction to start discharging by self-sustained operation to the discharge control circuit 182. At this time, the second control circuit 184 also instructs the switch circuit 183 to select output from the discharge control circuit 182. When having received the discharge start instruction, the discharge control circuit 182 outputs a control instruction to the second DC/DC conversion circuit 17, and the discharge control circuit 182 starts to control the second DC/DC conversion circuit 17 by voltage control. Thus, discharge control for the storage battery 2 by voltage control is started (S11, see FIG. 6 described later).

Here, the voltage control by the discharge control circuit 182 will be described.

As described above, in a normal operation, bus voltage between the positive and negative DC buses 25 is controlled by the DC/AC conversion circuit 21. However, in the case of power outage, since power is not supplied from the power system 3, the bus voltage cannot be controlled by the DC/AC conversion circuit 21. Therefore, basically, the bus voltage is controlled by the second DC/DC conversion circuit 17 which can output desired voltage by obtaining power by discharging of the storage battery 2. Specifically, the discharge control circuit 182 acquires the value of bus voltage measured by the voltmeter 19, and controls output voltage of the second DC/DC conversion circuit 17 so that the measured value becomes a predetermined first control target voltage.

It is noted that in the present embodiment 1, the first control target voltage is set at the same value as the control target voltage described in a normal operation, which is used in the case where bus voltage is controlled by the DC/AC conversion circuit 21 based on an instruction from the third control section 22. However, the first control target voltage does not always need to be set at the same value as the control target voltage used in the case where bus voltage is controlled by the DC/AC conversion circuit 21, but may be set at a different value as necessary.

When the bus voltage has become the first control target voltage by the discharge control circuit 182 of the second control section 18 controlling the second DC/DC conversion circuit 17, the second control section 18 reports this to the third control section 22. When having received the report, the third control section 22 activates the DC/AC conversion circuit 21 by voltage control. Specifically, a reference sine wave (for example, 60 Hz) as a reference is generated in the third control section 22, and the DC/AC conversion circuit 21 is controlled so that a voltage waveform outputted from the voltmeter 23 becomes the same sine wave as the reference sine wave. When supply of power from the DC/AC conversion circuit 21 has been started, the load 4 in a home is activated and starts to consume power. At this time, if discharge power from the storage battery 2 is small, the bus voltage decreases to be lower than the first control target voltage, and therefore the second control section 18 issues a control instruction to the second DC/DC conversion circuit 17 so as to increase discharge power from the storage battery 2. Based on the control instruction, the second DC/DC conversion circuit 17 controls ON/OFF of a switching circuit (not shown) provided therein, to increase discharge power from the storage battery 2.

Figure 5:
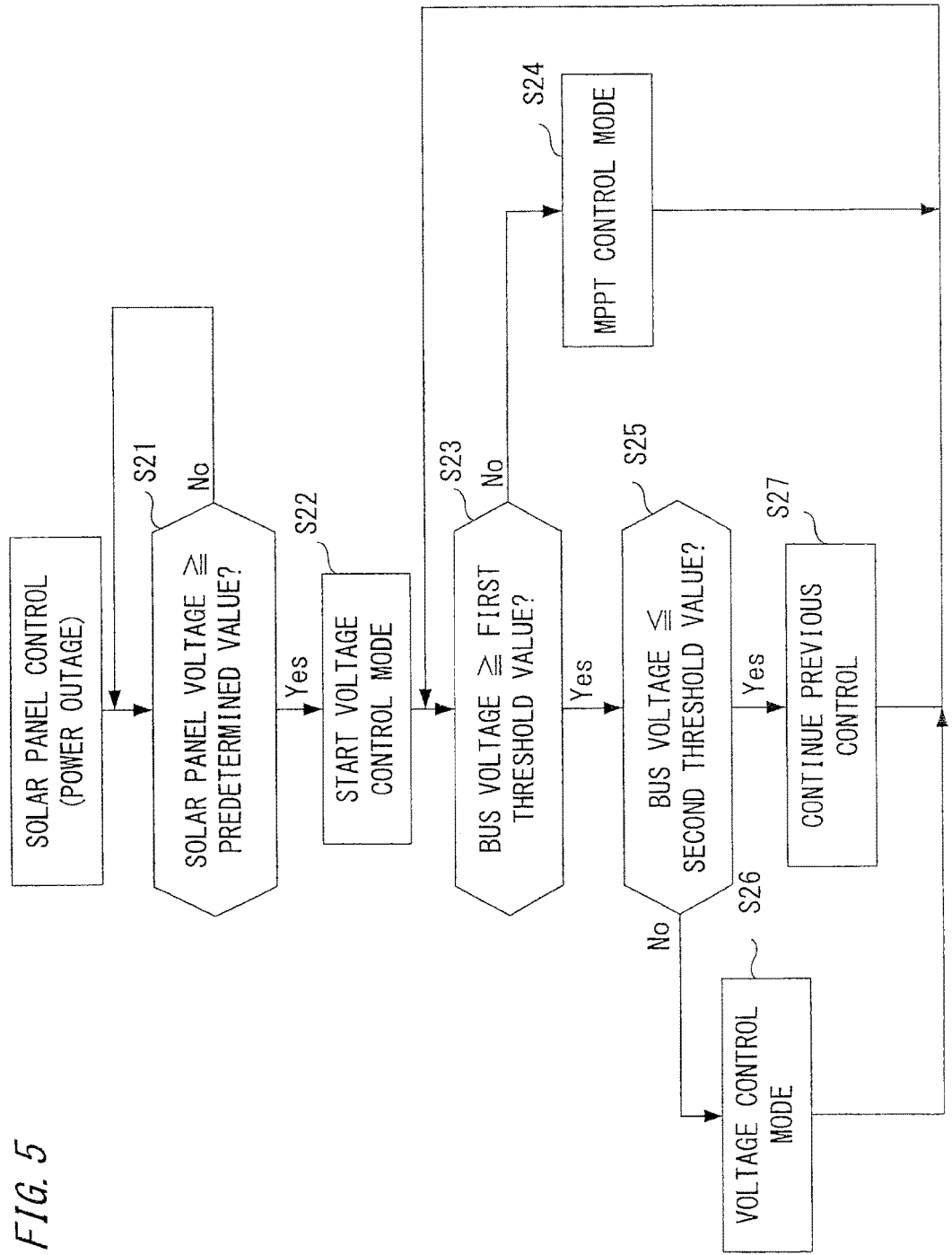
FIG. 5 is a control flow of the first control section in the case of power outage according to embodiment 1 of the present invention.

When supply of power from the DC/AC conversion circuit 21 to the load 4 has been started, the third control section 22 instructs the first control section 14 to start power generation from the solar panel 1. Hereinafter, control for the solar panel 1 by the power conversion device 10 in the case of power outage will be described with reference to FIGS. 2 and 5. It is noted that FIG. 5 is a control flow of the first control section 14 in the case of power outage.

The power generation start instruction for the solar panel 1 from the third control section 22 is received by the first control circuit 144 in the first control section 14. When having received the power generation start instruction, the first control circuit 144 confirms whether or not panel voltage is equal to or greater than a predetermined value, based on a measured value obtained from the voltmeter 11 which measures the panel voltage (S21). If the panel voltage is smaller than the predetermined value, the first control circuit 144 determines that power generation by the solar panel 1 cannot be performed, and waits until the panel voltage becomes the predetermined value. If the panel voltage of the solar panel 1 is equal to or greater than the predetermined value, the first control circuit 144 instructs the voltage control circuit 142 to start the voltage control mode for the solar panel 1, whereby power generation by the voltage control mode is started (S22). At this time, the first control circuit 144 also instructs the switch circuit 143 to select output of the voltage control circuit 142. It is noted that the predetermined value is set in advance as a value that allows power generation by the solar panel 1. Here, the predetermined value is set at the same value as the predetermined value used for determining whether or not power generation by the solar panel 1 can be performed in a normal operation. However, the predetermined value may be set appropriately as necessary.

When having received the voltage control mode start instruction from the first control circuit 144, the voltage control circuit 142 controls the solar panel 1 by the voltage control mode, and controls the first DC/DC conversion circuit 13 so that the bus voltage becomes predetermined second control target voltage. Specifically, the voltage control circuit 142 acquires the value of bus voltage measured by the voltmeter 19, and controls output voltage of the first DC/DC conversion circuit 13 so that the measured value becomes the second control target voltage.

Here, the second control target voltage in the voltage control mode is set to be greater than the first control target voltage which is the target value of bus voltage for the second DC/DC conversion circuit 17.

In the case of power outage, in order to stably supply power during a long period, it is necessary to preferentially use power generation by the solar panel 1 which is natural energy while preventing power stored in the storage battery 2 from being consumed more than necessary. As described above, the second control target voltage which is the target value of bus voltage for the first DC/DC conversion circuit 13 in the voltage control mode for the solar panel 1 is set to be greater than the first control target voltage which is the target value of bus voltage for the second DC/DC conversion circuit 17 which performs voltage control for the storage battery 2. Therefore, in the case where generated power by the solar panel 1 is sufficient, the bus voltage can be maintained at the second control target voltage by output power from the solar panel 1, and during this period, discharging from the storage battery 2 can be suppressed. On the other hand, in the case where power consumed by the load 4 is greater than generated power by the solar panel 1, the bus voltage cannot be maintained at the second control target voltage by generated power from the solar panel 1, so that the bus voltage decreases. When the bus voltage has decreased, discharging from the storage battery 2 is started so that the bus voltage will not become smaller than the first control target voltage in the voltage control mode for the storage battery 2, and thus the bus voltage is controlled at the first control target voltage. If power consumed by the load 4 has decreased so that generated power by the solar panel 1 can sufficiently cover the power consumed by the load 4, the bus voltage increases and is controlled at the second control target voltage again, whereby discharging from the storage battery 2 can be suppressed.

It is noted that in the voltage control mode for the solar panel 1, control of bus voltage is performed by both the first DC/DC conversion circuit 13 and the second DC/DC conversion circuit 17. It can be said that the second DC/DC conversion circuit 17 controls the bus voltage so as not to be smaller than the first control target voltage.

When the voltage control mode for the solar panel 1 has been started in step S22, the first control circuit 144 confirms whether or not the bus voltage is equal to or greater than a first threshold value, based on a measured value of the voltmeter 19 (S23). The first threshold value is set in advance to be smaller than the second control target voltage. If the bus voltage is smaller than the first threshold value, the first control circuit 144 determines that generated power from the solar panel 1 is smaller than power consumed by the load 4, and switches the control for the solar panel 1 to the MPPT control mode, to start the MPPT control (S24). At this time, the first control circuit 144 instructs the switch circuit 143 to select a control instruction value outputted from the MPPT control circuit 141. As described above, since power generation efficiency in MPPT control is greater than in voltage control, generated power from the solar panel 1 can be increased by switching the control mode from the voltage control mode to the MPPT control mode, and thus generated power of the solar panel 1 can be effectively used. When control for the solar panel 1 has been started by MPPT control in step S24, the process returns to step S23 to repeat the subsequent processing from the step S23. It is noted that in this case, the bus voltage is controlled by the second DC/DC conversion circuit 17 based on drive control by the second control section 18, and therefore MPPT control for the solar panel 1 can be performed.

If the bus voltage is equal to or greater than the first threshold value in step S23, the process proceeds to step S25 to confirm whether or not the bus voltage is equal to or smaller than a second threshold value. The second threshold value is set in advance to be greater than the second control target voltage. If the bus voltage is greater than the second threshold value, the first control circuit 144 determines that generated power from the solar panel 1 is greater than power consumed by the load 4, and switches the control for the solar panel 1 to the voltage control mode, to start the voltage control mode (S26). The reason is as follows. In the case where the bus voltage is greater than the second threshold value, since generated power by the solar panel 1 is greater than power consumed by the load 4, surplus power is generated. In the case of power outage, the surplus power cannot be regenerated to the power system 3, and therefore the surplus power charges a capacitor (not shown) that manages the bus voltage, whereby the bus voltage increases. In this state, if generated power from the solar panel 1 is kept being supplied by the MPPT control having high power generation efficiency, the bus voltage further increases, so that the power conversion device 10 might stop due to overvoltage eventually. Besides, it is conceivable that the bus voltage exceeds tolerable voltage of a mounted component and the component is broken. Therefore, in step S26, the control mode for the solar panel 1 is switched from the MPPT control mode to the voltage control mode, whereby generation of surplus power can be suppressed. When the control for the solar panel 1 has been started by voltage control in step S26, the process returns to step S23 to repeat the subsequent processing from step S23.

If the bus voltage is equal to or greater than the first threshold value in step S23 and the bus voltage is equal to or smaller than the second threshold value in step S25, that is, the bus voltage is a value between the first threshold value and the second threshold value, it is determined that balance between generated power of the solar panel 1 and power consumed by the load 4 is kept in the present control, and the present control is continued (S27). Then, the process returns to step S23 to repeat the subsequent processing from step S23.

As described in steps S21 to S27, the first control section 14 which controls output from the solar panel 1 by drive-controlling the first DC/DC conversion circuit 13 switches the control mode between two kinds of control modes, i.e., the MPPT control mode and the voltage control mode, based on the measured value of bus voltage which is control information of the second control section 18 which controls the bus voltage in the case of power outage by drive-controlling the second DC/DC conversion circuit 17.

In the case where power consumed by the load 4 is greater than generated power of the solar panel 1, the bus voltage decreases to be lower than the second control target voltage, and therefore it is found that generated power by the solar panel 1 is insufficient. On the other hand, in the case where power consumed by the load 4 is smaller than generated power of the solar panel 1, since surplus power is generated, the bus voltage increases to be greater than the second control target voltage, and therefore it is found that power is excessively generated by the solar panel 1. Accordingly, as described above, the actual value of bus voltage measured by the voltmeter 19 is compared with the first threshold value set to be smaller than the second control target voltage, and with the second threshold value set to be greater than the second control target voltage, and then, based on a result of the comparison, the control mode is switched between the MPPT control mode and the voltage control mode. Thus, an effect is provided that the power conversion device 10 can be stably controlled, generated power of the solar panel 1 can be effectively used, and the discharge amount from the storage battery 2 can be minimized.

Figure 6:
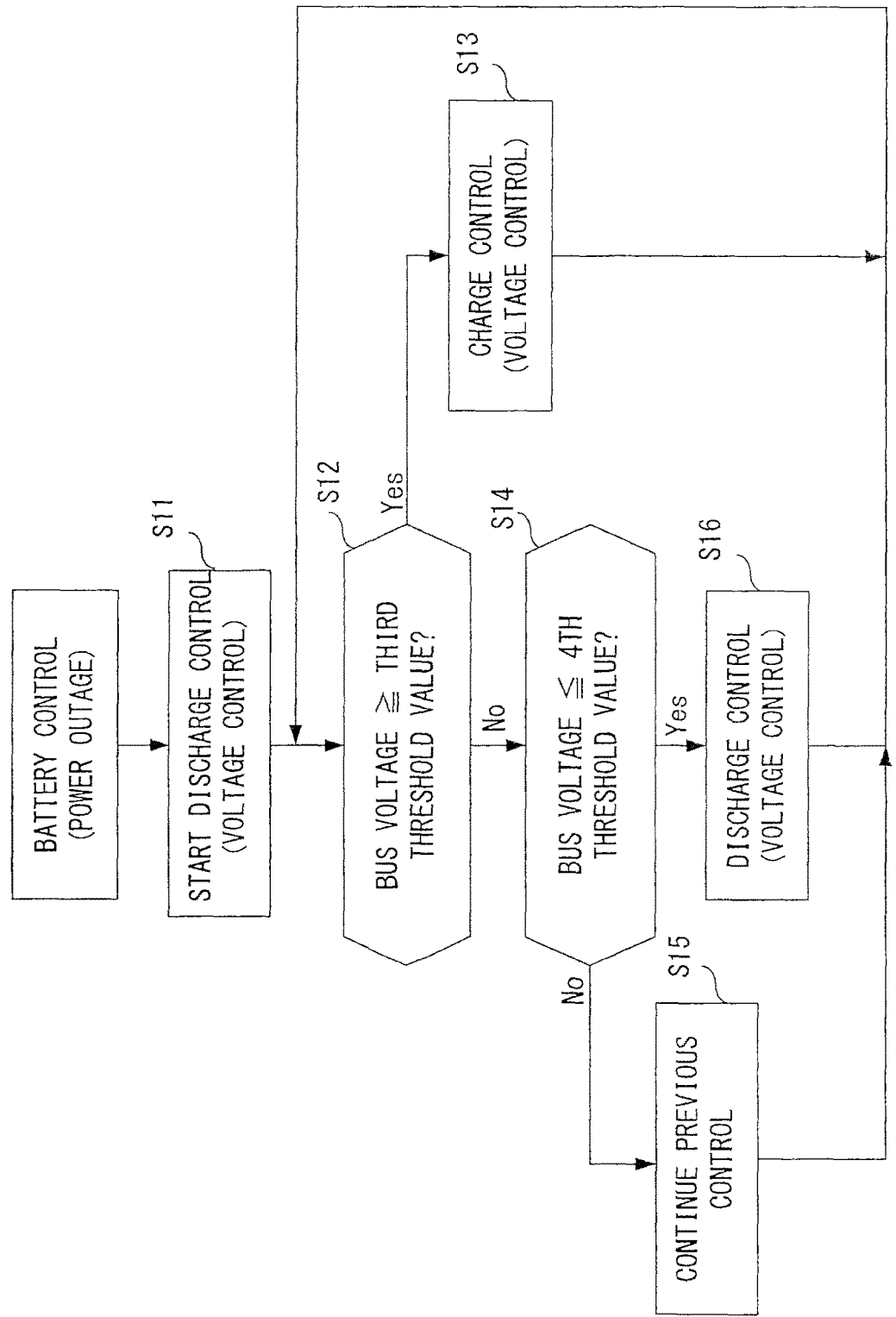
FIG. 6 is a control flow of the second control section in the case of power outage according to embodiment 1 of the present invention.

Next, control for the storage battery 2 by the power conversion device 10 in the case of power outage will be described with reference to FIGS. 3 and 6. It is noted that FIG. 6 is a control flow of the second control section 18 in the case of power outage.

When power outage has occurred and the second control circuit 184 of the second control section 18 has received a discharge instruction from the third control section 22, the second control circuit 184 issues an instruction to the discharge control circuit 182, whereby discharge control for the storage battery 2 by voltage control is started (S11). At this time, the second control circuit 184 also instructs the switch circuit 183 to select output of the discharge control circuit 182. When discharge control for the storage battery 2 has been started in step S11, the second control circuit 184 confirms whether or not the bus voltage is equal to or greater than a third threshold value, based on a measured value of the voltmeter 19 (S12). The third threshold value is set to be greater than the second control target voltage which is the target value of bus voltage in the case of controlling the solar panel 1 by the voltage control mode, and smaller than the second threshold value which is a reference for switching the control mode for the solar panel 1 from the MPPT control mode to the voltage control mode. If the bus voltage is equal to or greater than the third threshold value, it is considered that generated power by the solar panel 1 is greater than power consumed by the load 4 and therefore surplus power is generated. Therefore, if the bus voltage is equal to or greater than the third threshold value, it is determined that surplus power is generated, and the second control circuit 184 instructs the charge control circuit 181 to start charge control, and switches the control for the storage battery 2 to charge control by voltage control (S13). At this time, the second control circuit 184 also instructs the switch circuit 183 to select output of the charge control circuit 181. Thus, the surplus power generated by the solar panel 1 charges the storage battery 2, and the surplus power can be effectively used. When the charge control for the storage battery 2 has been started in step S13, the process returns to step S12 to repeat the subsequent processing from step S12.

If the bus voltage is smaller than the third threshold value in step S12, the process proceeds to step S14 to confirm whether or not the bus voltage is equal to or smaller than a fourth threshold value. The fourth threshold value is set in advance to be greater than the first control target voltage which is the target value of bus voltage in discharge control for the storage battery 2, and smaller than the third threshold value. Here, the fourth threshold value is set such that the difference between the third threshold value and the fourth threshold value is as great as possible. Further, in view of relevance to the control for the solar panel 1, the fourth threshold value is set to be greater than the first threshold value which is a reference for switching the control mode for the solar panel 1 from the voltage control mode to the MPPT control mode, and smaller than the second control target voltage which is the target value of bus voltage in the voltage control mode for the solar panel 1. If the bus voltage is greater than the fourth threshold value, it is determined that balance between generated power of the solar panel 1 and power consumed by the load 4 including the storage battery 2 is kept in the present control. In the case of charge control, the storage battery 2 is regarded as a load, and in the case of discharge control, the storage battery 2 is regarded as a power supply source, and thus it is determined that power balance is kept as a whole. In this case, the present control is continued (S15). After step S15, the process returns to step S12 to repeat the subsequent processing from step S12.

If the bus voltage is equal to or smaller than the fourth threshold value in step S14, it is determined that generated power of the solar panel 1 is smaller than power consumed by the load 4, and the second control circuit 184 issues a charge stop instruction to the charge control circuit 181, and instructs the discharge control circuit 182 to start discharge control (S16). At this time, the second control circuit 184 also instructs the switch circuit 183 to select a control instruction from the discharge control circuit 182. By starting the discharge control for the storage battery 2, deficiency of generated power of the solar panel 1 can be compensated by the storage battery 2. When the control for the storage battery 2 has been started by discharge control in step S16, the process returns to step S12 to repeat the subsequent processing from step S12.

It is noted that as described above, in the present embodiment 1, the fourth threshold value is set to be greater than the first control target voltage and smaller than the third threshold value, and is set such that the difference value between the third and fourth threshold values is as great as possible. Hereinafter, the reason will be described.

Depending on the configuration of the second DC/DC conversion circuit 17 for controlling the storage battery 2, basically, switching between charging and discharging of the storage battery 2 cannot be continuously performed like the DC/AC conversion circuit 21. In addition, for example, in the case of using a lithium-ion battery as the storage battery 2, if switching between charging and discharging is repeatedly performed, the storage battery 2 is deteriorated and the battery life is shortened.

In the present embodiment 1, switching between charging and discharging is performed based on the third threshold value and the fourth threshold value, whereby hysteresis is provided for the switching between charging and discharging. For example, in the case where generated power of the solar panel 1 almost coincides with power consumed by the load 4, charge/discharge control for the storage battery 2 is prevented from being switched by minute variation in the power consumed by the load 4, whereby an effect is provided that deterioration in the storage battery 2 can be suppressed. In addition, since the fourth threshold value is set to be greater than the first control target voltage, control for the storage battery 2 is switched to discharge control at the stage when generated power of the solar panel 1 still has a margin. Therefore, even if power consumed by the load 4 has sharply changed, since the storage battery 2 has been standing by in the discharge control, the control can follow the sharp change in the load 4, whereby power can be stably supplied to the load 4.

Figure 7:
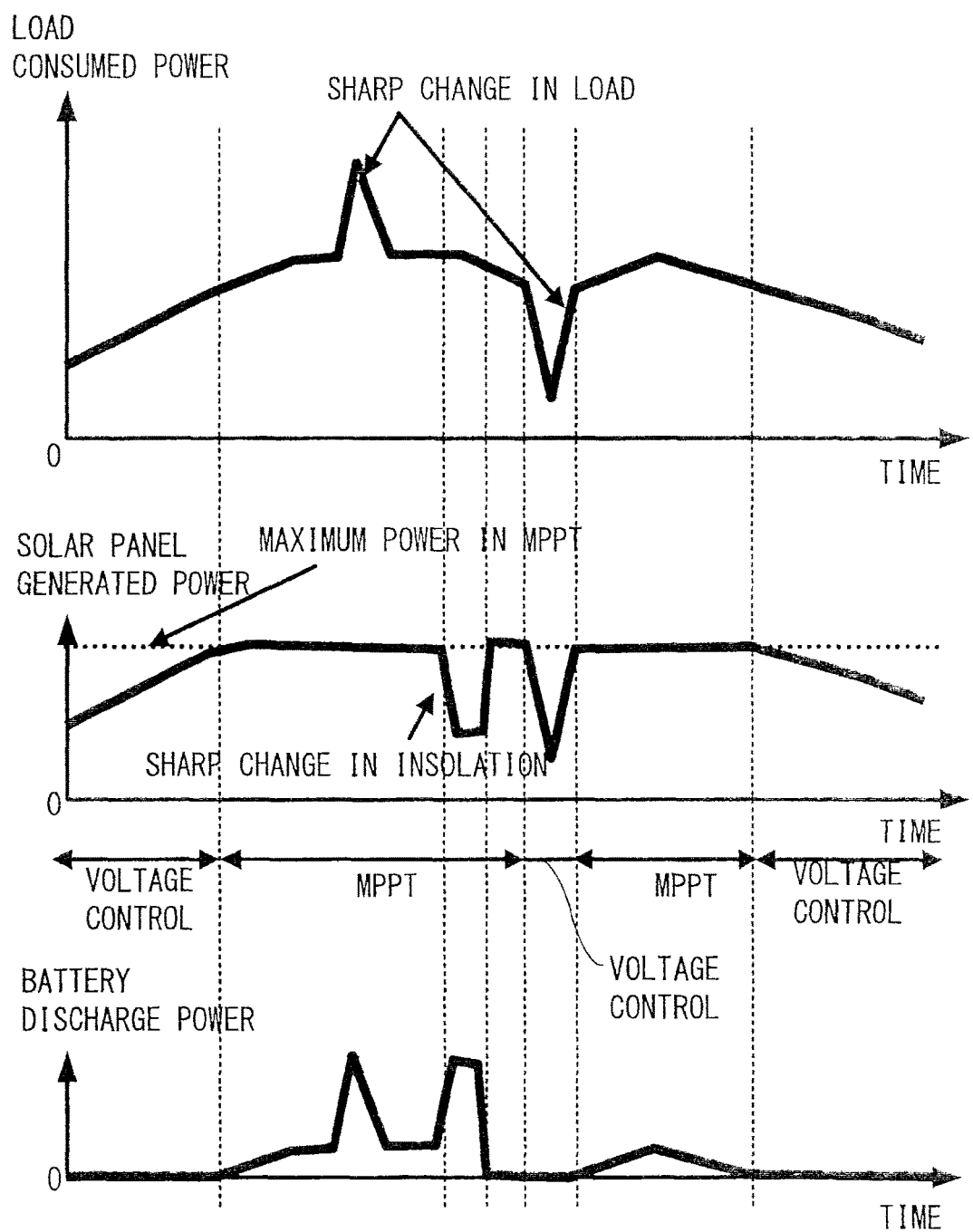
FIG. 7 is an operation explanation diagram for schematically explaining operation of the power conversion device in the case of power outage according to embodiment 1 of the present invention.

Here, with reference to FIG. 7, operation of the power conversion device 10 in the case of power outage will be schematically described. FIG. 7 is an operation explanation diagram for schematically explaining operation of the power conversion device 10 in the case of power outage. In FIG. 7, a graph at the top shows variation in power consumption in a load, a graph at the middle shows variation in generated power from the solar panel 1, and a graph at the bottom shows variation in discharge power from the storage battery 2.

As shown in FIG. 7, first, when power consumed by the load 4 is small, the solar panel 1 is controlled by voltage control, and the power consumed by the load 4 is covered by only generated power of the solar panel 1. Thereafter, when power consumed by the load 4 increases and the bus voltage has become smaller than the first threshold value, the control for the solar panel 1 is switched to MPPT control, whereby power of the solar panel 1 is efficiently used. Then, when power consumed by the load 4 further increases, power is discharged from the storage battery 2 so that shortage in the generated power of the solar panel 1 is compensated by the storage battery 2, and the resultant power is supplied to the load 4. Also when power consumed by the load 4 has sharply changed so that the power consumption has sharply increased, deficient power is supplied from the storage battery 2. In addition, also when the insolation amount has sharply changed so that the generated power of the solar panel 1 has decreased suddenly, deficient power is supplied from the storage battery 2.

On the other hand, when power consumed by the load 4 has sharply changed so that the power consumption has decreased, the control for the solar panel 1 is switched to voltage control and discharging from the storage battery 2 is stopped. Therefore, surplus power is not generated and the control can be switched to an appropriate one before system failure occurs. Then, when power consumed by the load 4 has returned to its original state, the control for the solar panel 1 returns to MPPT control and discharging from the storage battery 2 is started, whereby power can be stably supplied.

As described above, when the power system 3 is in a power outage state, the power conversion device 10 of the present embodiment 1 switches the control mode for the solar panel 1 to the MPPT control mode or the voltage control mode based on the measured value of bus voltage measured by the voltmeter 19. Therefore, when power consumed by the load 4 is great, power can be efficiently obtained from the solar panel 1 by the MPPT control mode, and thus generated power of the solar panel 1 can be effectively used. In addition, when power consumed by the load 4 is small, generation of surplus power can be suppressed by the voltage control mode, whereby system failure due to surplus power can be prevented and reliability of the power conversion device 10 can be improved.

In addition, by efficiently obtaining power from the solar panel 1 when power consumed by the load 4 is great, the power conversion device 10 of the present embodiment 1 can suppress discharging from the storage battery 2, and in the case of power outage, can stably supply power to the load 4 during a long period.

In addition, the power conversion device 10 of the present embodiment 1 performs switching of the control mode for the solar panel 1, based on the measured value of bus voltage, that is, if the bus voltage is equal to or smaller than the first threshold value set to be smaller than the second control target voltage which is the target value of bus voltage in the voltage control mode for the solar panel 1, selects MPPT control, and if the bus voltage is equal to or smaller than the second threshold value set to be greater than the second control target voltage, selects voltage control. Thus, change in power consumed by the load 4 can be reliably confirmed with a simple configuration, and power generation by the solar panel 1 can be effectively used.

In addition, if the bus voltage is equal to or smaller than the fourth threshold value set to be greater than the first threshold value and smaller than the second control target voltage, the second control section 18 starts discharge control for the storage battery 2 via the second DC/DC conversion circuit 17. Therefore, when power consumed by the load 4 is greater than generated power from the solar panel 1, at the stage when the generated power from the solar panel 1 still has a margin, discharge control for the storage battery 2 can be started. In addition, since the first threshold value is smaller than the fourth threshold value, the solar panel 1 can be switched to MPPT control only when power consumed by the load 4 is definitely greater than generated power from the solar panel 1. In addition, since discharge control for the storage battery 2 is started at the stage when generated power from the solar panel 1 still has a margin, even if power consumed by the load 4 has sharply changed, the storage battery 2 has been standing by in the discharge control and the control can follow the sharp change in the load 4, whereby power can be stably supplied to the load 4.

It is noted that the fourth threshold value is a predetermined threshold value of the present invention.

In addition, the second control target voltage in the voltage control mode for the solar panel 1 is set to be greater than the first control target voltage which is the target value of bus voltage for the second DC/DC conversion circuit 17 which performs voltage control for the storage battery 2. Therefore, generated power of the solar panel 1 can be preferentially supplied to the load 4, whereby discharging from the storage battery 2 can be suppressed and power can be stably supplied to the load 4 during a long period.

It is noted that in the present embodiment 1, the solar panel 1 is used as a distributed power supply, but the present invention is not necessarily limited thereto. For example, wind power generation or water-power generation may be used. In the case of the solar panel 1, the MPPT control mode and the voltage control mode are used as the two kinds of control modes. Also in the case of wind power generation or water-power generation, a power control mode for deriving the maximum power and a voltage control mode for controlling output voltage may be used as such two kinds of control modes.

In the present embodiment 1, the second DC/DC conversion circuit 17 is connected to the storage battery 2, and controls the bus voltage by obtaining power from the storage battery 2. However, the second DC/DC conversion circuit 17 does not necessarily need to be connected to the storage battery 2, but may be connected to any power source as long as the power source can output power for controlling the bus voltage. As a matter of course, the storage battery 2 is not limited to a stationary battery. For example, a battery of an electric automobile or an electric motorcycle may be used.

If a lithium-ion battery is used as the storage battery 2, a battery management unit (BATTERY MANAGEMENT UNIT) included on the battery side manages the stored power amount, whether or not charging or discharging is possible, the maximum charge current in charging, and the like, and reports them to the second control section 18. However, in the present embodiment 1, the case where the management of the stored power amount, whether or not charging or discharging is possible, the maximum charge current in charging, and the like is performed by the second control section 18 has been described.

In the present embodiment 1, the case where DC power supplied from the solar panel 1 or the storage battery 2 is converted to AC power by the DC/AC conversion circuit 21 once, and then the AC power is supplied to the load 4, has been described. However, the present invention is not limited thereto. For example, DC power may be directly supplied to the load 4 from the DC bus 25, or DC power may be supplied through DC/DC conversion to the load 4. Thus, DC power may be supplied to a so-called DC-feed-adapted load 4.

In addition, the first control target voltage of bus voltage for the second DC/DC conversion circuit and the second control target voltage of bus voltage for the first DC/DC conversion circuit may be set in accordance with battery voltage of the storage battery 2, for example. In addition, when the values of the first control target voltage and the second control target voltage are changed, the first to fourth threshold values may also be changed in accordance with the values of the first control target voltage and the second control target voltage.

In the present embodiment 1, for the purpose of simplification, the case where each control is performed by hardware has been described, but the present invention is not limited thereto. The same effect is provided also in the case where all or some of the above-described circuits are realized by software. The function of each circuit may be divided for software and hardware so as to realize the same function.

Embodiment 2

Next, a power conversion device according to embodiment 2 of the present invention will be described. In the power conversion device of the present embodiment 2, control algorithms of the first control section 14 and the second control section 18 in the case where the power system 3 is in a power outage state are partially different as compared to the above embodiment 1. The circuit configuration of the power conversion device is the same as in the above embodiment 1. Therefore, the same reference characters are assigned and the detailed description thereof is omitted. Hereinafter, the detailed operation in the case of power outage in the present embodiment 2 will be described.

When power outage has occurred on the power system 3, for example, automatically, a switch or the like (not shown) provided between the power system 3, and the power conversion device 10 and the load 4 in a home, is turned off, whereby connection between the power system 3, and the power conversion device 10 and the load 4 in a home, is disconnected. After the disconnection between the power system 3, and the power conversion device 10 and the load 4 in a home has been confirmed, the third control section 22 instructs the second control section 18 to start discharge control for the storage battery 2.

The discharge instruction from the third control section 22 to the second control section 18 is received by the second control circuit 184 in the second control section 18, and the second control circuit 184 confirms whether or not discharging from the storage battery 2 is possible and the allowable discharge power amount. If discharging from the storage battery 2 is possible, the second control circuit 184 outputs an instruction to start discharging by self-sustained operation to the discharge control circuit 182. At this time, the second control circuit 184 also instructs the switch circuit 183 to select output from the discharge control circuit 182. When having received the instruction to start discharge by self-sustained operation from the second control circuit 184, the discharge control circuit 182 outputs a control instruction to the second DC/DC conversion circuit 17, whereby the discharge control circuit 182 starts discharge control for the second DC/DC conversion circuit 17 by voltage control (S41, see FIG. 9 described later). It is noted that as in the above embodiment 1, in the case of power outage, since power is not supplied from the power system 3, the bus voltage cannot be controlled by the DC/AC conversion circuit 21. Therefore, basically, the bus voltage is controlled by the second DC/DC conversion circuit 17. Specifically, the discharge control circuit 182 acquires the value of bus voltage measured by the voltmeter 19, and performs control so that the measured value becomes the first control target voltage which is a predetermined target value of the bus voltage.

When the value of bus voltage measured by the voltmeter 19 has become the first control target voltage by the second control section 18 controlling the second DC/DC conversion circuit 17, the second control section 18 reports this to the third control section 22. When having received the report, the third control section 22 activates the DC/AC conversion circuit 21 by voltage control. Specifically, a reference sine wave (for example, 60 Hz) as a reference is generated in the third control section 22, and the DC/AC conversion circuit 21 is controlled so that a voltage waveform outputted from the voltmeter 23 becomes the same sine wave as the reference sine wave. When supply of power from the DC/AC conversion circuit 21 has been started, the load 4 such as a refrigerator, an illumination, or a television in a home is activated and starts to consume power.

Figure 8:
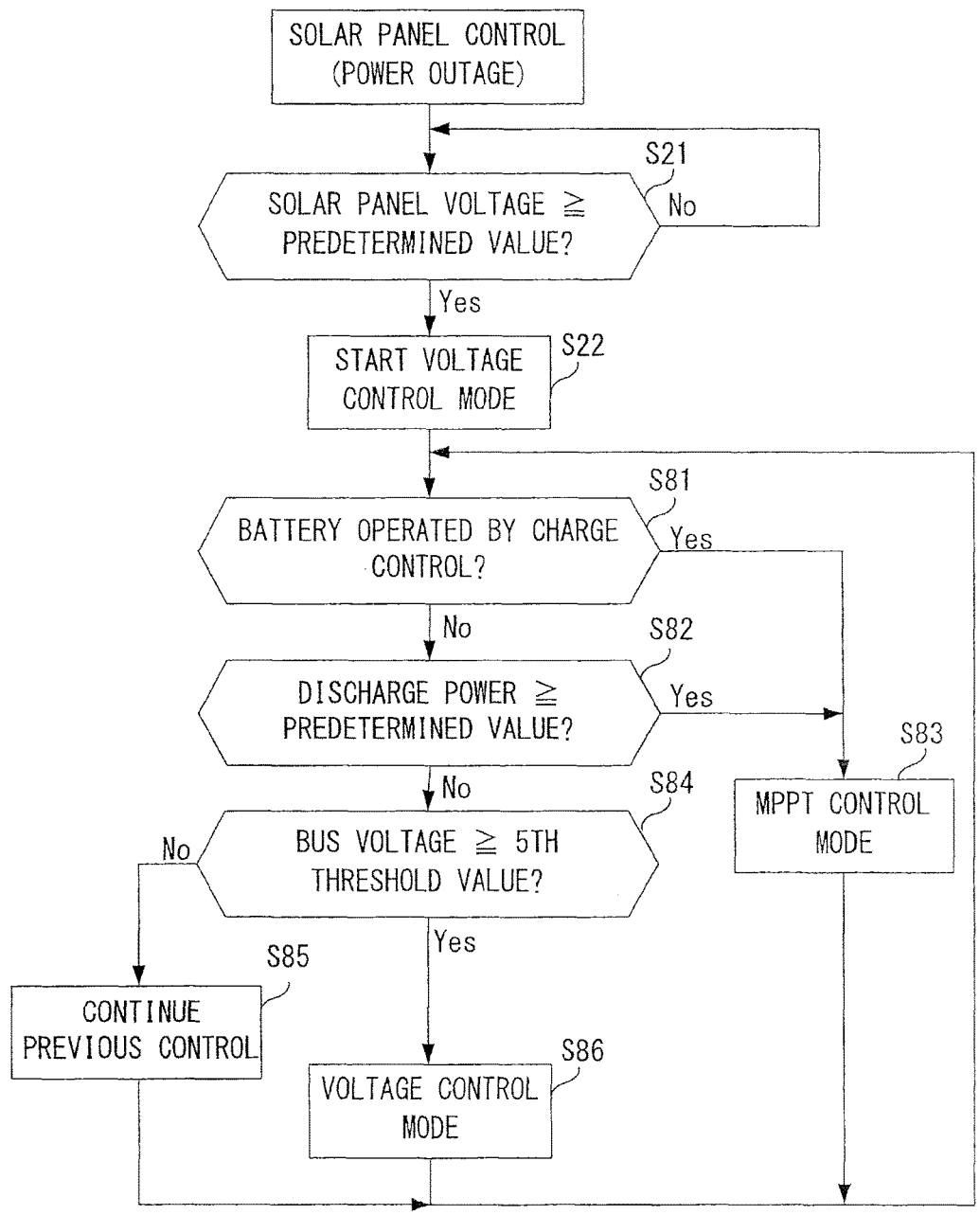
FIG. 8 is a control flow of a first control section in the case of power outage according to embodiment 2 of the present invention.

When supply of power from the DC/AC conversion circuit 21 to the load 4 has been started, the third control section 22 instructs the first control section 14 to start power generation from the solar panel 1. Hereinafter, control for the solar panel 1 by the power conversion device 10 in the case of power outage will be described with reference to FIG. 8. FIG. 8 is a control flow of the first control section 14 in the case of power outage.

The power generation start instruction for the solar panel 1 from the third control section 22 is received by the first control circuit 144 in the first control section 14. When having received the power generation start instruction, the first control circuit 144 confirms solar panel voltage based on a measured value obtained from the voltmeter 11 which measures the solar panel voltage (S21). If the solar panel voltage is smaller than the predetermined value, the first control circuit 144 determines that power generation by the solar panel 1 cannot be performed, and waits until the panel voltage becomes the predetermined value. If the panel voltage of the solar panel 1 is equal to or greater than the predetermined value, the first control circuit 144 instructs the voltage control circuit 142 to start the voltage control for the solar panel 1, whereby power generation of the solar panel 1 by the voltage control is started (S22). At this time, the first control circuit 144 also instructs the switch circuit 143 to select output of the voltage control circuit 142. Processing from when power outage has occurred on the power system 3 to step S22 is basically the same as in the above embodiment 1. The following operation is partially different from that in the above embodiment 1.

Here, in the present embodiment 2, in a normal operation, in the MPPT control mode for the solar panel 1, panel voltage Vmax at the maximum power point of the solar panel 1 is measured and stored. It is noted that as the panel voltage Vmax to be measured, the average voltage when the solar panel 1 is generating power equal to or greater than a predetermined value, the average voltage at each time point over several days, or the like is stored.

Then, as in the above embodiment 1, when having received the voltage control mode start instruction from the first control circuit 144, the voltage control circuit 142 controls the solar panel 1 by the voltage control mode, and controls the first DC/DC conversion circuit 13 so that the bus voltage becomes the second control target voltage. At this time, in the present embodiment 2, panel voltage of the solar panel 1 is decreased within a voltage control range in the voltage control mode, and panel voltage Vmin at which power starts to be supplied from the solar panel 1 is measured. It is noted that the panel voltage Vmin may be calculated from panel voltage and generated power at two or more points in the voltage control mode. It is noted that as in the above embodiment 1, the second control target voltage which is the target value of bus voltage in the voltage control mode for the solar panel 1 is set to be greater than the first control target voltage which is the target value of bus voltage in the voltage control for the storage battery 2. Thus, as in the embodiment 1, power generation by the solar panel 1 is preferentially used, whereby discharging from the storage battery 2 can be suppressed.

When voltage control for the solar panel 1 has been started in step S22, the first control circuit 144 confirms whether or not charge control for the storage battery 2 is being performed (S81). It is noted that the charge/discharge control information about the storage battery 2 is, for example, a control instruction value outputted from the second control section 18 to the second DC/DC conversion circuit 17. Alternatively, for example, the charge/discharge control information may be charge power or discharge power of the storage battery 2 calculated from a measured value obtained by the voltmeter 15 which measures battery voltage of the storage battery 2 or the ammeter 16 which measures charge/discharge current of the storage battery 2. If the storage battery 2 is operating by charge control in step S81, the first control circuit 144 issues a control instruction to the MPPT control circuit 141, and switches the control for the solar panel 1 to the MPPT control mode (S83). At this time, the first control circuit 144 instructs the switch circuit 143 to select a control instruction value outputted from the MPPT control circuit 141. In the case of charge control for the storage battery 2, surplus power generated by the solar panel 1 that cannot be consumed by the load 4 can be used to charge the storage battery 2. Therefore, the control mode for the solar panel 1 is switched to the MPPT control mode, whereby generated power of the solar panel 1 can be used maximally, and surplus power that cannot be consumed by the load 4 can be used to charge the storage battery 2. Therefore, power supply balance can be kept as a whole, and power can be stably supplied to the load 4.

If discharge control for the storage battery 2 is being performed in step S81, the first control circuit 144 confirms whether or not discharge power from the storage battery 2 is equal to or greater than a predetermined value. Then, if the discharge power is equal to or greater than the predetermined value, the process proceeds to step S83, and the first control circuit 144 issues a control instruction to the MPPT control circuit 141 and switches the control for the solar panel 1 to the MPPT control mode. At this time, the first control circuit 144 instructs the switch circuit 143 to select a control instruction value outputted from the MPPT control circuit 141. Here, if discharge power equal to or greater than the predetermined value is being supplied from the storage battery 2, it is found that generated power by the solar panel 1 in the voltage control mode is being controlled at the lower limit voltage of the voltage control range shown in FIG. 4. This means that even though the solar panel 1 is able to generate more power, the generated power cannot be derived sufficiently because of the limited voltage control range. Therefore, in embodiment 2 of the present invention, the control mode for the solar panel 1 is switched from the voltage control mode to the MPPT control mode, whereby generated power of the solar panel 1 is increased and effectively used.

If discharge power from the storage battery 2 is smaller than the predetermined value in step S82, the first control circuit 144 confirms whether or not the bus voltage is equal to or greater than a fifth threshold value (S84). The fifth threshold value is the same value as the second threshold value of the above embodiment 1, and is set in advance to be greater than the second control target voltage which is the target value of bus voltage in the voltage control mode for the solar panel 1. As a result of the confirmation, if the bus voltage is smaller than the fifth threshold value, it is determined that balance between generated power by the solar panel 1 and power consumed by the load 4 including the storage battery 2 is kept, and the previous control is continued (S85). In the case of charge control, the storage battery 2 is regarded as a load, and in the case of discharge control, the storage battery 2 is regarded as a power supply source, and thus it is determined that power balance is kept as a whole, and the previous control is continued.

If the bus voltage is equal to or greater than the fifth threshold value in step S84, the first control circuit 144 issues a control instruction to the voltage control circuit 142, to switch the control for the solar panel 1 to the voltage control mode (S86). This is based on the following reason, as in the embodiment 1. In the case where the bus voltage is greater than the fifth threshold value, since generated power by the solar panel 1 is greater than power consumed by the load 4, surplus power is generated. In the case of power outage, the surplus power cannot be regenerated to the power system 3, and therefore the surplus power charges a capacitor (not shown) that manages the bus voltage, whereby the bus voltage increases. In this state, if generated power from the solar panel 1 is kept being supplied by the MPPT control having high power generation efficiency, the bus voltage further increases, so that the power conversion device 10 might stop due to overvoltage eventually. Besides, it is conceivable that the bus voltage exceeds tolerable voltage of mounted components and the components are damaged. Therefore, also in the present embodiment 2, the control mode for the solar panel 1 is switched to the voltage control mode, whereby generation of surplus power can be suppressed.

Figure 9:
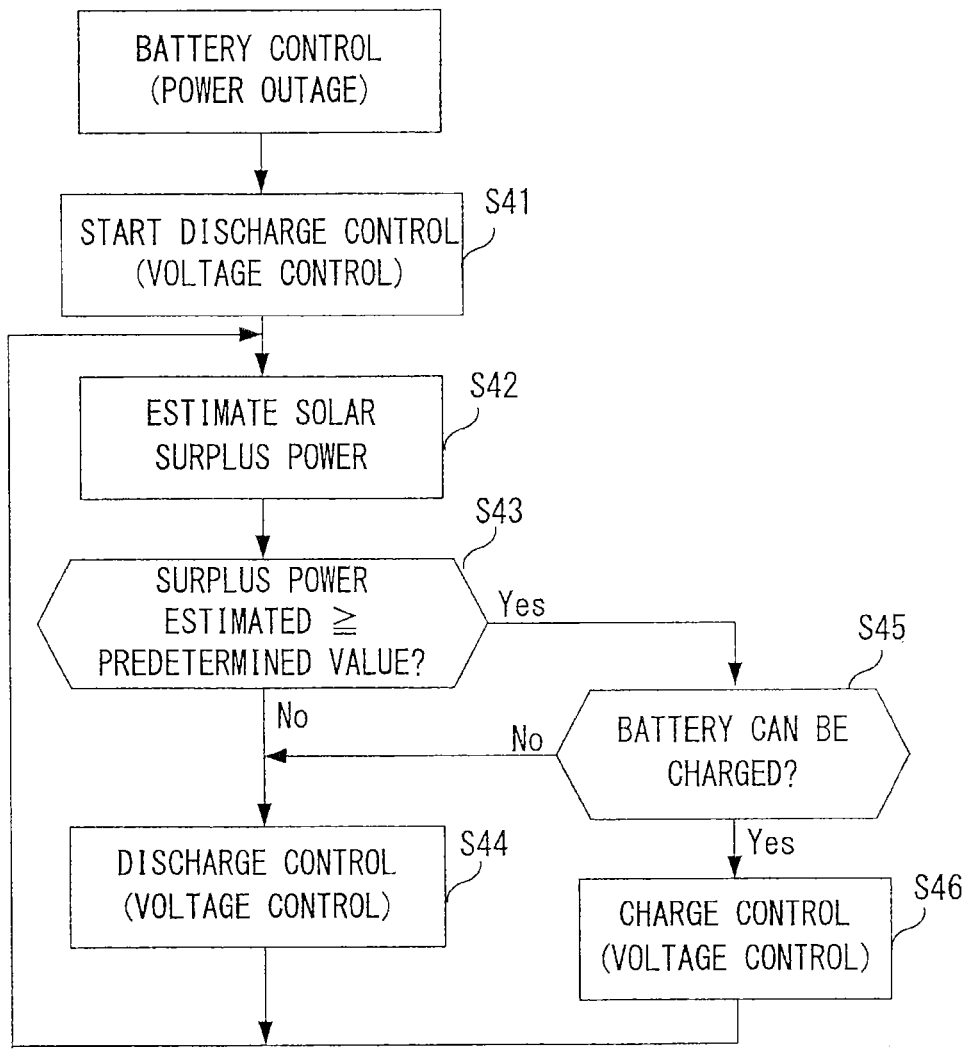
FIG. 9 is a control flow of a second control section in the case of power outage according to embodiment 2 of the present invention.
Figure 10:
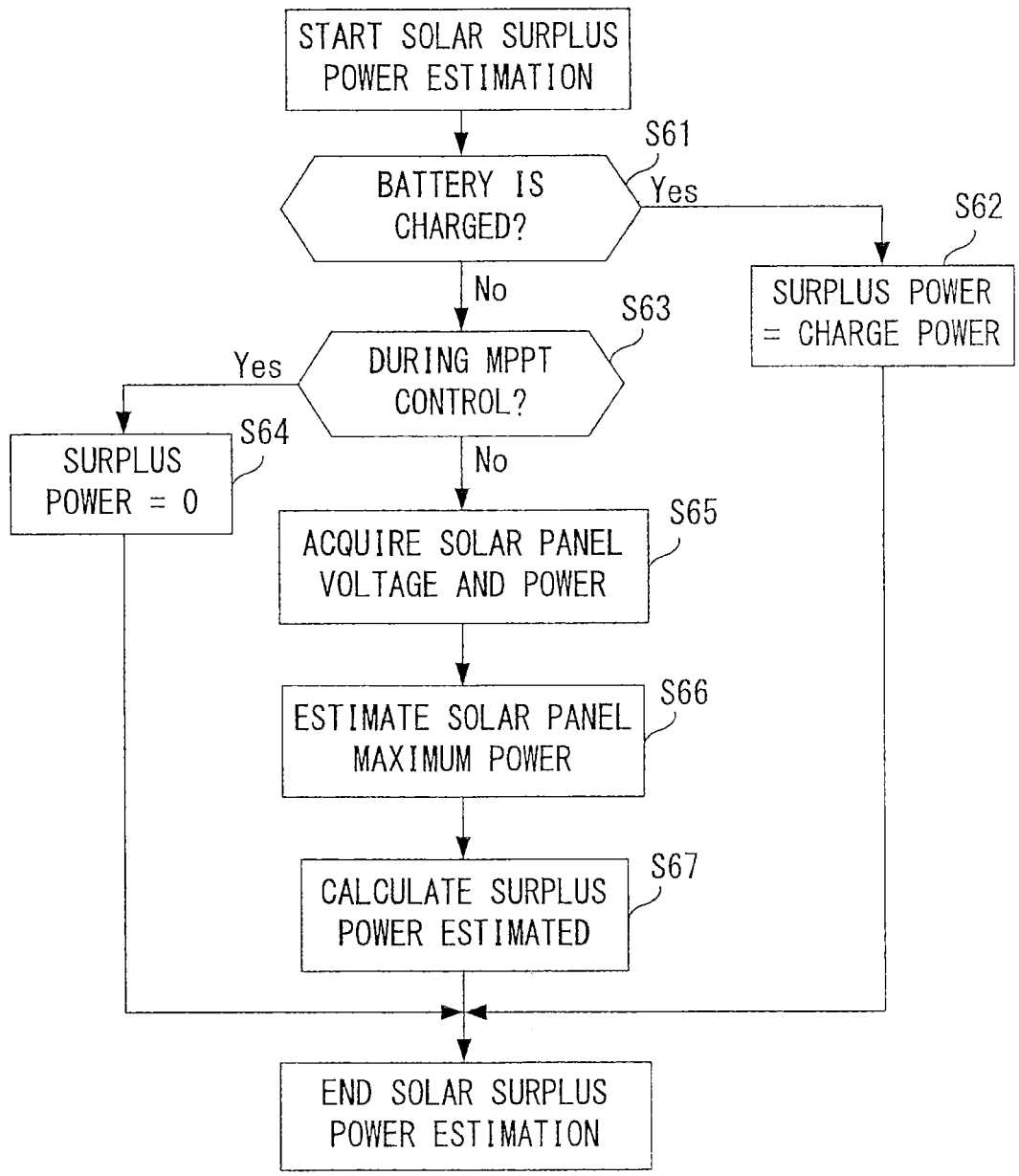
FIG. 10 is a control flow for explaining control of solar power generation surplus power estimation according to embodiment 2 of the present invention.
Figure 11:
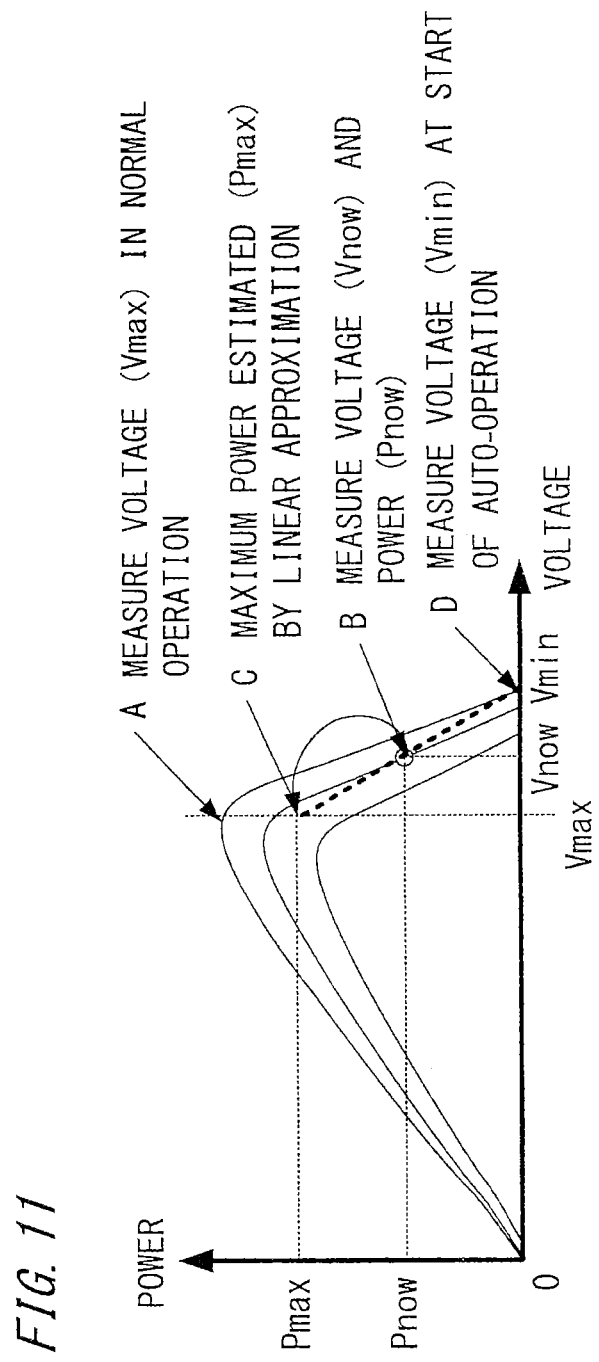
FIG. 11 is an explanation diagram for explaining the control flow of solar power generation surplus power estimation according to embodiment 2 of the present invention.

On the other hand, control for the storage battery 2 in the power conversion device 10 in the case of power outage will be described with reference to FIGS. 9 to 11. FIG. 9 is a control flow of the second control section 18 in the case of power outage, and FIG. 10 is a control flow for explaining control of solar power generation surplus power estimation by the second control section 18. FIG. 11 is an explanation diagram for explaining the control flow of solar power generation surplus power estimation, and shows a power-voltage characteristic of the solar panel 1.

In FIG. 11, A is a point where voltage (Vmax) at the maximum power point is measured in a normal operation, B is a point where the present voltage (Vnow) and the present generated power (Pnow) are measured, C is a maximum generated power estimated value (Pmax) based on linear approximation, and D is a point where voltage (Vmin) at which power starts to be supplied is measured at the start of self-sustained operation.

When power outage has occurred and the second control circuit 184 of the second control section 18 has received a discharge instruction from the third control section 22, the second control circuit 184 issues an instruction to the discharge control circuit 182, whereby discharge control for the storage battery 2 by voltage control is started (S41). At this time, the second control circuit 184 also instructs the switch circuit 183 to select output from the discharge control circuit 182. When discharge control for the storage battery 2 has been started in step S41, the second control circuit 184 estimates surplus power that can be generated by the solar panel 1 (S42).

Hereinafter, an estimation method for the surplus power will be described in detail. When estimation of surplus power of the solar panel 1 has been started, the second control circuit 184 confirms whether or not the storage battery 2 is being charged (S61). If the storage battery 2 is being charged, the whole surplus power is supplied to charge the storage battery 2, and therefore the surplus power is equal to the charge power. Therefore, an estimated value of surplus power is set at the charge power (S62). If the storage battery 2 is not being charged in step S61, the second control circuit 184 confirms whether or not the solar panel 1 is being controlled by the MPPT control mode (S63). If the solar panel 1 is being controlled by the MPPT control mode in step S63, an estimated value of surplus power is set at 0 (S64), and the solar power generation surplus power estimation is ended.

If the solar panel 1 is being controlled by the voltage control mode in step S63, the present panel voltage Vnow and the present generated power Pnow of the solar panel 1 are acquired (S65). Then, the maximum generated power Pmax of the solar panel 1 is estimated by using the panel voltage Vmax at the maximum power point of the solar panel 1 acquired in the MPPT control for the solar panel 1 in a normal operation, and the panel voltage Vmin at which power starts to be supplied from the solar panel 1, acquired in the voltage control mode for the solar panel 1 at the start of a self-sustained operation (S66). It is noted that in the present embodiment 2, Pmax is calculated by linear approximation. Specifically, Pmax is calculated by the following expression.

$$Pmax=(Vmin-Vmax)/(Vmin-Vnow) \times Pnow$$

It is noted that although in the present embodiment 2, the panel voltage Vmin at which power starts to be supplied from the solar panel 1 is acquired at the start of self-sustained operation, the panel voltage Vmin may be acquired in the control for the solar panel 1 at the start of normal operation, for example.

After Pmax has been estimated in step S66, Pnow (the present generated power of the solar panel 1) is subtracted from Pmax (the maximum generated power estimated value of the solar panel 1), and the resultant value is used as an estimated value of surplus power (S67). Thus, the estimation of surplus power that can be generated by the solar panel 1 is ended.

After surplus power generated by the solar panel 1 has been estimated in step S42, the second control circuit 184 confirms whether or not the estimated value of surplus power that has been calculated is equal to or greater than a predetermined value (S43). If the estimated value of surplus power is smaller than the predetermined value, the second control circuit 184 instructs the discharge control circuit 182 to start discharge control for the storage battery 2 by voltage control via the second DC/DC conversion circuit 17 (S44). At this time, the second control circuit 184 also instructs the switch circuit 183 to select output from the discharge control circuit 182.

If the estimated value of surplus power is equal to or greater than the predetermined value in step S43, the second control circuit 184 confirms whether or not the storage battery 2 can be charged (S45). If the storage battery 2 is in a full charge state and therefore cannot be charged, the process proceeds to step S44 to perform discharge control for the storage battery 2 (S44). If the storage battery 2 can be charged, the second control circuit 184 issues a charge instruction to the charge control circuit 181, to start charge control for the storage battery 2 by voltage control via the second DC/DC conversion circuit 17 (S46). At this time, the second control circuit 184 also instructs the switch circuit 183 to select output of the charge control circuit 181.

The predetermined value to be compared with the estimated value of surplus power in step S43 is set at a value that allows determination that surplus power from the solar panel 1 is sufficient. As also described in the above embodiment 1, in the case where, for example, a lithium-ion battery is used as the storage battery 2, if switching between charging and discharging is repeated, the storage battery 2 is deteriorated and the battery life is shortened. Therefore, the predetermined value to be compared with the estimated value of surplus power is set as described above and control is performed such that the storage battery 2 is charged only when generated power by the solar panel 1 has a sufficient margin, whereby charge/discharge control for the storage battery 2 is prevented from being switched by minute variation in the power consumed by the load 4. Therefore, an effect is provided that power can be stably supplied to the load 4 without giving unnecessary damage to the storage battery 2.

It is noted that the reason why, in the present embodiment 2, the estimation of surplus power is not performed by only the present panel voltage value of the solar panel 1 is as follows. As shown in FIG. 11, the maximum generated power of the solar panel 1 greatly varies by factors such as the insolation amount or the temperature of the solar panel 1. Therefore, if the estimation of surplus power for the solar panel 1 is performed by only the present panel voltage of the solar panel 1, the estimated value of the maximum generated power can be greatly deviated by factors such as the insolation amount and the temperature. If charge/discharge control for the storage battery 2 is switched based on the greatly deviated estimated value, the control for the storage battery 2 might be switched to charge control in the condition that there is actually almost no surplus power. Then, it becomes necessary to switch the charge/discharge control just by slight variation in power consumed by the load 4. In addition, if the control for the storage battery 2 is switched to charge control in the condition that there is actually almost no surplus power, when power consumed by the load 4 has increased suddenly, the power supply amount for the load 4 from the power conversion device 10 is insufficient, and therefore a problem arises that, for example, an apparatus is not activated or the power conversion device 10 cannot follow the sudden change in the power consumption and therefore stops. Therefore, by estimating surplus power of the solar panel 1 as described in the present embodiment 2, it becomes possible to accurately estimate surplus power and perform appropriate switching of the charge/discharge control for the storage battery 2.

Embodiment 3

Next, a power conversion device according to embodiment 3 of the present invention will be described. In the power conversion device of the present embodiment 3, control algorithms of the first control section 14 and the second control section 18 in the case where the power system 3 is in a power outage state are partially different as compared to the above embodiment 1 or 2. The circuit configuration of the power conversion device is the same as in the above embodiment 1. Therefore, the same reference characters are assigned and the detailed description thereof is omitted.

The configuration of the power conversion device 10, the configuration of the first control section 14, and the configuration of the second control section 18 will be described with reference to FIG. 1, FIG. 2, and FIG. 3, respectively.

Figure 12:
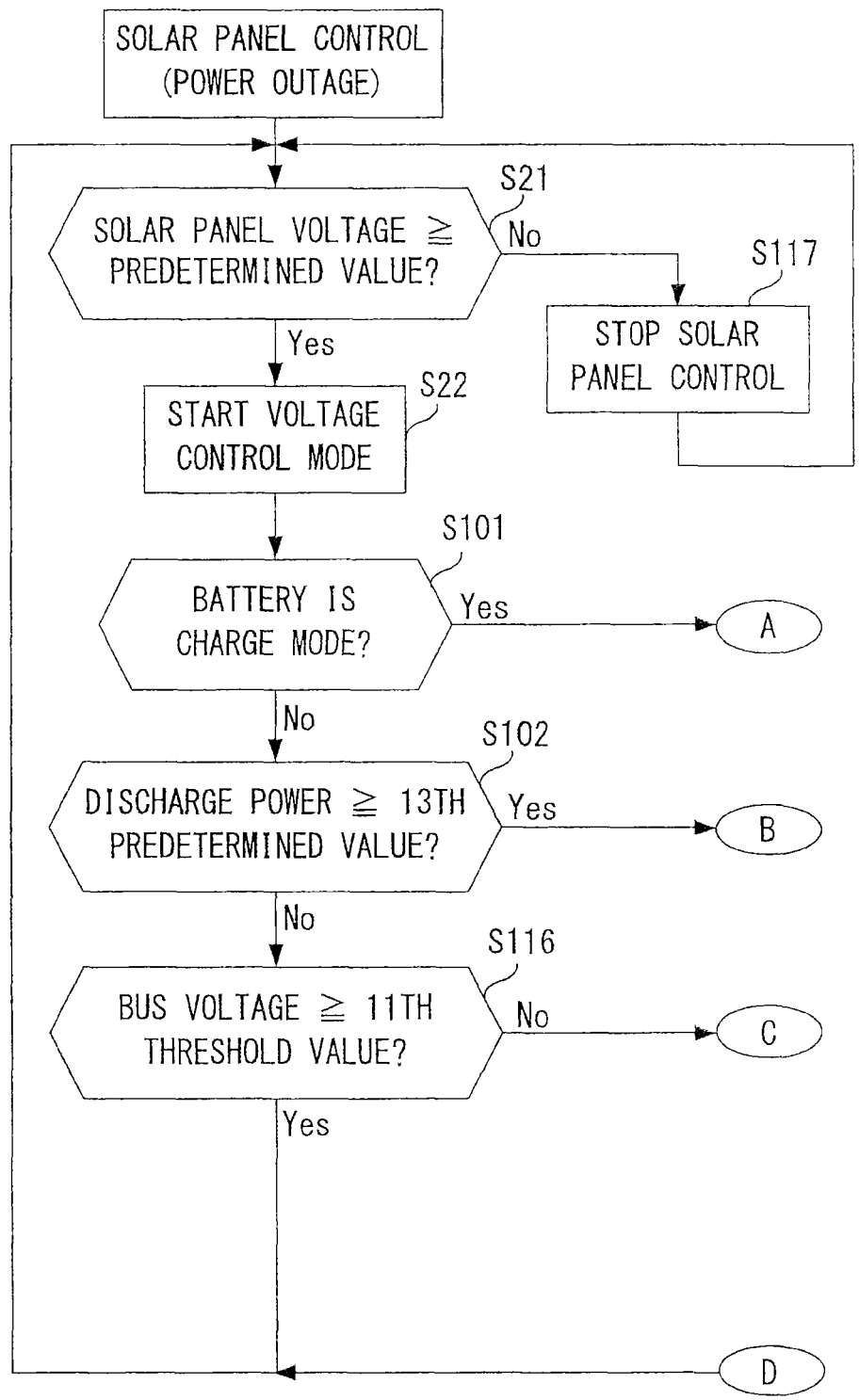
FIG. 12 is a control flow of a first control section in the case of power outage according to embodiment 3 of the present invention.
Figure 13:
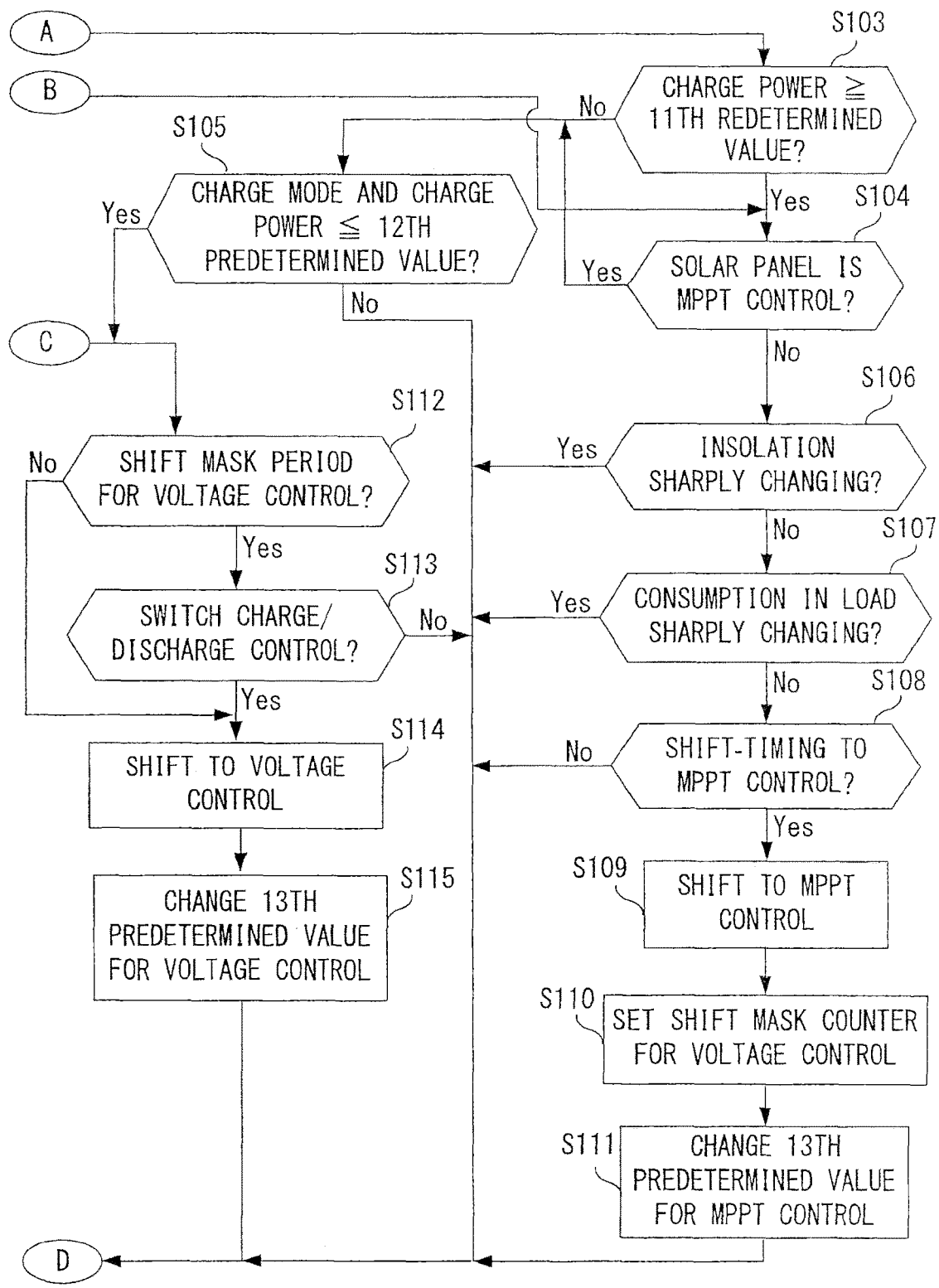
FIG. 13 is a control flow of the first control section in the case of power outage according to embodiment 3 of the present invention.
Figure 14:
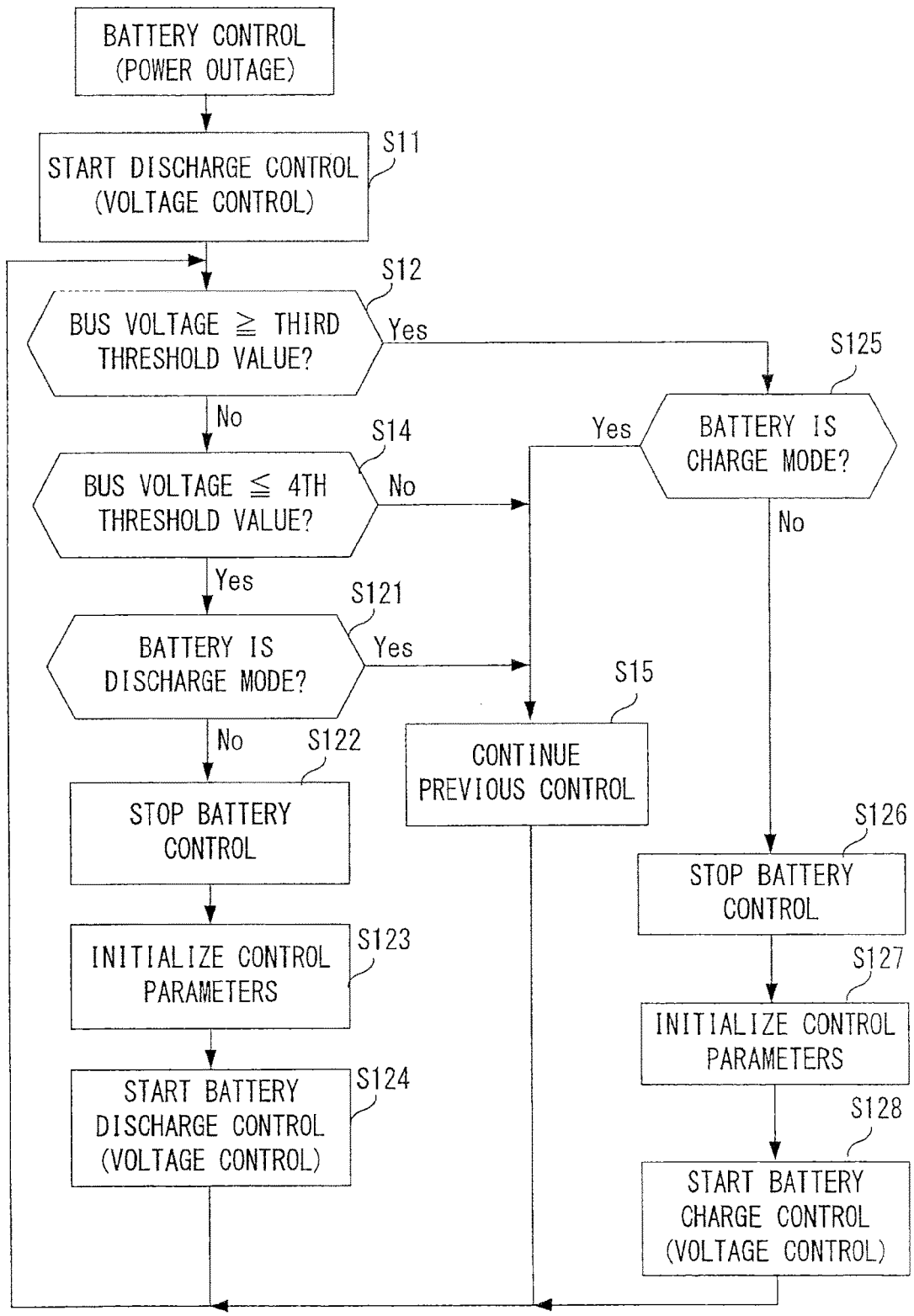
FIG. 14 is a control flow of a second control section in the case of power outage according to embodiment 3 of the present invention.

In FIGS. 12 and 13 showing a control flow of the first control section 14 in a stopped state, the same step numbers are assigned to processing steps equivalent to those in FIGS. 5 and 8 showing the corresponding control flows of embodiments 1 and 2. In addition, in FIG. 14 showing a control flow of the second control section 18 in a stopped state, the same step numbers are assigned to processing steps equivalent to those in FIG. 6 showing the corresponding control flow of embodiment 1.

Figure 15:
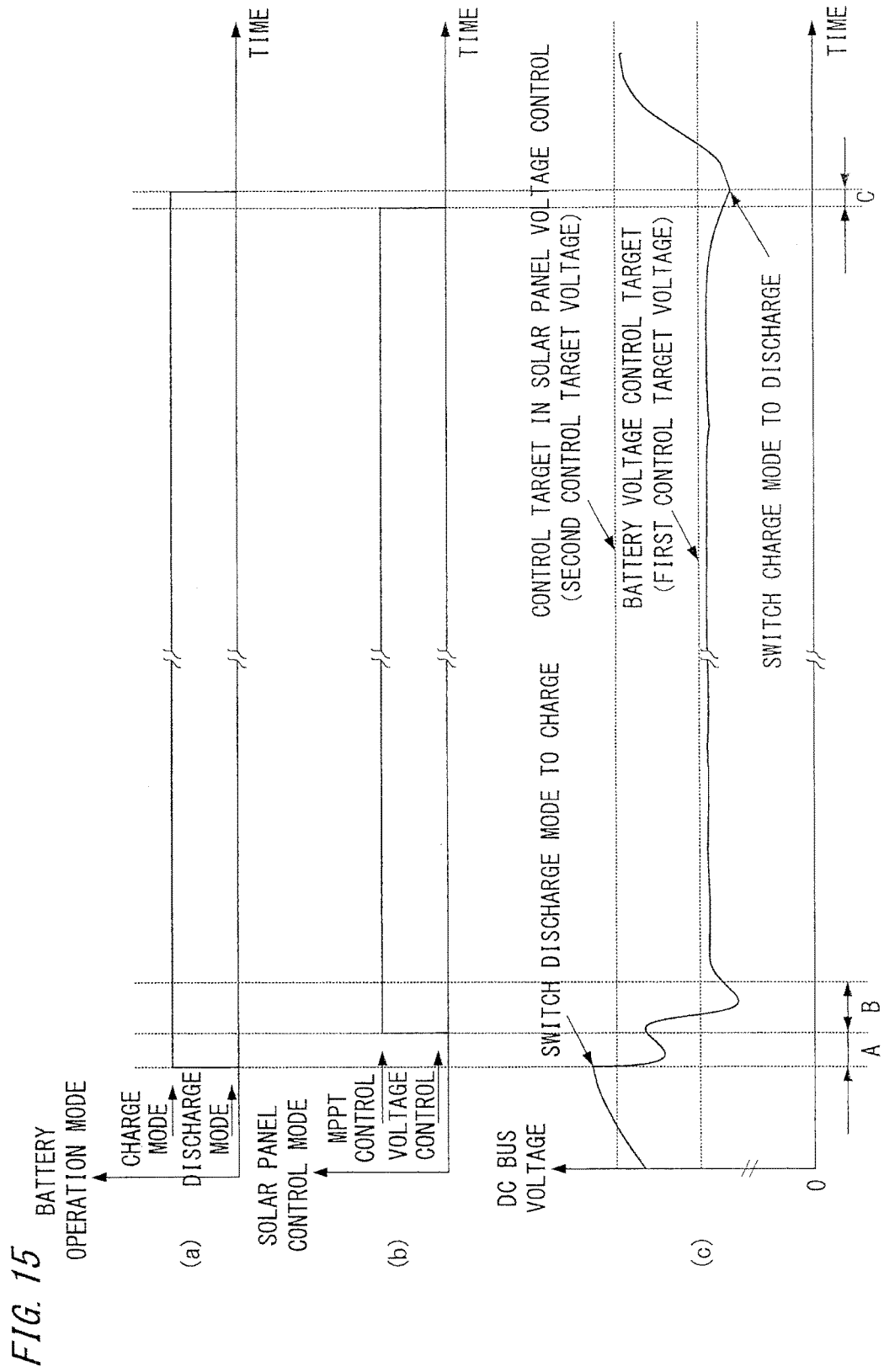
FIG. 15 is an operation explanation diagram for schematically explaining operation of a power conversion device in the case of power outage according to embodiment 3 of the present invention.
Figure 16:
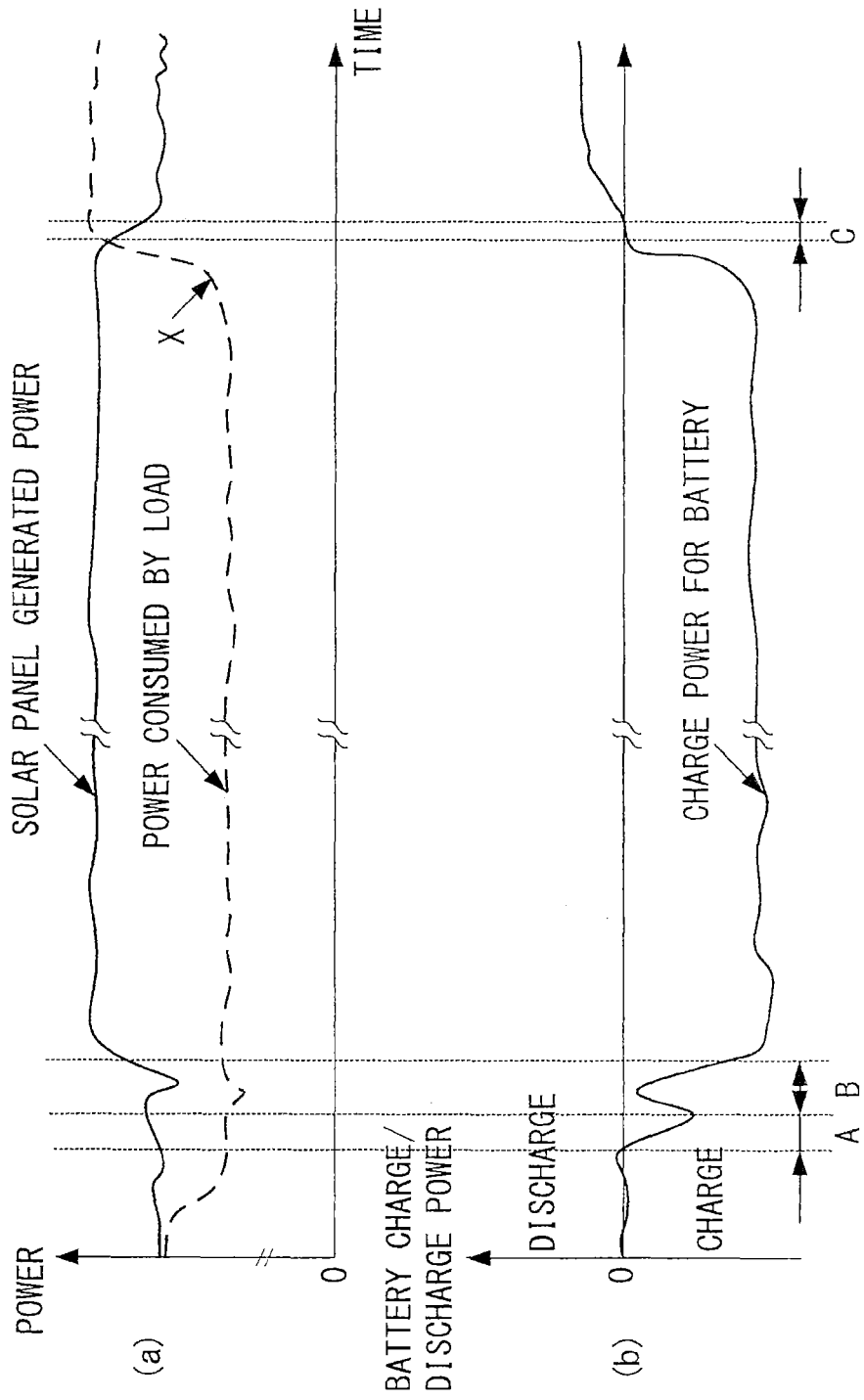
FIG. 16 is an operation explanation diagram for schematically explaining operation of the power conversion device in the case of power outage according to embodiment 3 of the present invention.

FIGS. 12 and 13 explain one flowchart by their two drawings. FIGS. 15 and 16 explain a series of operations by their two drawings.

It is noted that FIG. 15(a) shows a timing of switching the operation mode (charge or discharge) for the storage battery 2, FIG. 15(b) shows a timing of switching the control mode (MPPT control or voltage control) for the solar panel 1, and FIG. 15(c) shows temporal variation in the DC bus voltage. FIG. 16(a) shows temporal variations in generated power of the solar panel 1 and power consumed by the load 4, and FIG. 16(b) shows temporal variation in charge/discharge power of the storage battery 2.

Hereinafter, the detailed operation in the case of power outage in the present embodiment 3 will be described.

In embodiment 3, specifically, a control method for reducing hunting behavior (behavior that the voltage control mode and the MPPT control mode are alternately switched at short intervals) caused when the control mode is switched from the voltage control mode to the MPPT control mode by the first control section 14 will be described.

As in embodiment 2, when power outage of the power system 3 has been detected, for example, automatically, a switch or the like (not shown) provided between the power system 3, and the power conversion device 10 and the load 4 in a home, is turned off, whereby connection between the power system 3, and the power conversion device 10 and the load 4 in a home, is disconnected. After the disconnection between the power system 3, and the power conversion device 10 and the load 4 in a home has been confirmed, the third control section 22 instructs the second control section 18 to start discharge control for the storage battery 2.

By using charge/discharge power of the storage battery 2 calculated from measured values of the voltmeter 15 and the ammeter 16, control for suppressing hunting behavior between the voltage control mode and the MPPT control mode is performed.

It is noted that the voltmeter 15 and the ammeter 16 correspond to a power measuring section for measuring charge/discharge power of the power accumulating section of the present invention.

Hereinafter, control for the storage battery 2 in the power conversion device 10 in the case of power outage will be described with reference to FIG. 14.

The discharge instruction from the third control section 22 to the second control section 18 is received by the second control circuit 184 in the second control section 18, and the second control circuit 184 confirms whether or not discharging from the storage battery 2 is possible and the allowable discharge power amount. If discharging from the storage battery 2 is possible, the second control circuit 184 outputs an instruction to start discharging by self-sustained operation to the discharge control circuit 182. At this time, the second control circuit 184 also instructs the switch circuit 183 to select output from the discharge control circuit 182. When having received the instruction to start discharge by self-sustained operation from the second control circuit 184, the discharge control circuit 182 outputs a control instruction to the second DC/DC conversion circuit 17, and the second DC/DC conversion circuit 17 starts discharge control by voltage control (S11 in FIG. 14).

It is noted that as in the above embodiment 2, in the case of power outage, since power is not supplied from the power system 3, the bus voltage cannot be controlled by the DC/AC conversion circuit 21. Therefore, basically, the bus voltage is controlled by the second DC/DC conversion circuit 17. Specifically, the discharge control circuit 182 acquires the value of bus voltage measured by the voltmeter 19, and performs control so that the measured value becomes the first control target voltage which is a predetermined target value of the bus voltage.

When the value of bus voltage measured by the voltmeter 19 has become the first control target voltage by the second DC/DC conversion circuit 17 being controlled, the second control section 18 reports this to the third control section 22. When having received the report, the third control section 22 activates the DC/AC conversion circuit 21 by voltage control.

Specifically, a reference sine wave (for example, AC200V, 60 Hz) as a reference is generated in the third control section 22, and the DC/AC conversion circuit 21 is controlled so that a voltage waveform outputted from the voltmeter 23 becomes the same sine wave as the reference sine wave. When supply of power from the DC/AC conversion circuit 21 has been started, the load 4 such as a refrigerator, an illumination, or a television in a home is activated and starts to consume power.

When supply of power from the DC/AC conversion circuit 21 to the load 4 has been started, the third control section 22 instructs the first control section 14 to start power generation from the solar panel 1.

Hereinafter, control for the solar panel 1 by the power conversion device 10 in the case of power outage will be described with reference to FIGS. 12 and 13. FIGS. 12 and 13 are control flows of the first control section 14 in the case of power outage.

The power generation start instruction for the solar panel 1 from the third control section 22 is received by the first control circuit 144 in the first control section 14. When having received the power generation start instruction, the first control circuit 144 confirms solar panel voltage based on a measured value obtained from the voltmeter 11 which measures the solar panel voltage (S21 in FIGS. 12 and 13).

If the solar panel voltage is smaller than the predetermined value, in S117, the first control circuit 144 determines that power generation by the solar panel 1 cannot be performed, and waits until the solar panel voltage becomes the predetermined value. It is noted that if the solar panel 1 is being controlled, the control (voltage control mode or MPPT control mode) for the solar panel 1 is stopped in S117.

On the other hand, if the panel voltage of the solar panel 1 is equal to or greater than the predetermined value, the first control circuit 144 instructs the voltage control circuit 142 to start controlling the solar panel 1 by the voltage control mode, whereby the solar panel 1 starts to generate power by voltage control (S22 in FIGS. 12 and 13). At this time, the first control circuit 144 also instructs the switch circuit 143 to select output of the voltage control circuit 142.

It is noted that if control for the solar panel 1 has been already started, the control for the solar panel 1 is continued. Processing from when power outage has occurred on the power system 3 to step S22 is basically the same as in the above embodiment 1 or 2. The following operation is partially different from that in the above embodiment 1 or 2.

Then, as in the above embodiment 1, when having received the voltage control mode start instruction from the first control circuit 144, the voltage control circuit 142 controls the solar panel 1 by the voltage control mode, and controls the first DC/DC conversion circuit 13 so that the bus voltage becomes the second control target voltage (a value higher than the control voltage target value in the control for the storage battery 2, see FIG. 15(c)). Thus, as in the embodiment 1, power generation by the solar panel 1 is preferentially used, whereby discharging from the storage battery 2 can be suppressed. Here, if power consumed by the load 4 in a home is small and generated power by the solar panel 1 is sufficiently obtained, DC bus voltage of the DC bus 25 gradually increases during a period from time 0 to the start of a period A, as shown in FIG. 15(c).

Then, the bus voltage becomes greater than the third threshold value (S12 in FIG. 14). When the bus voltage has become greater than the third threshold value, the second control circuit 184 in the second control section 18 switches the control for the storage battery 2 to charge control. Specifically, whether or not the present control mode for the storage battery 2 is a charge mode is confirmed in S125. If the present control mode is a charge mode, the charge mode is continued (S15).

On the other hand, if the present control mode is a discharge mode, a stop instruction is outputted to the discharge control circuit 182, to stop the second DC/DC conversion circuit 17 once (S126). Then, the second DC/DC conversion circuit 17, the charge control circuit 181, and the discharge control circuit 182 are instructed to initialize registers and various kinds of variables (parameters) (S127). After the initialization instruction has been completed, the second control circuit 184 outputs an activation instruction to the charge control circuit 181, and also instructs the switch circuit 183 to select output of the charge control circuit 181 (S128).

It is noted that in the present embodiment 3, based on the current value outputted from the ammeter 16, it is confirmed that operation of the second DC/DC conversion circuit 17 has been stopped. Then, after the confirmation that the second DC/DC conversion circuit 17 has been stopped, the control mode is switched and then the second DC/DC conversion circuit 17 is activated again.

When the control mode is switched from the discharge control mode to the charge control mode, rush current flows to the storage battery 2 just after the switching. At this time, the control response of the solar panel 1 cannot follow this, so that DC bus voltage of the DC bus 25 sharply decreases as shown at the start of the period A in FIG. 15(c). In the present embodiment 3, the DC bus voltage does not decrease to the voltage control target value of the storage battery 2, but, for example, in such a case where the capacitance of a capacitor (not shown) for smoothing DC bus voltage, connected to the DC bus 25 is small, the DC bus voltage may decrease to the voltage control target value of the storage battery 2.

In the present embodiment 3, the DC bus voltage that has decreased once gradually recovers to target voltage by surplus power of the solar panel 1. It is noted that, depending on the response performance in the voltage control for the storage battery 2, even in the case where the whole surplus power is supplied to charge the storage battery 2, the voltage value of DC bus voltage may not recover and may decrease straightly to the voltage control target value of the storage battery 2.

When the storage battery 2 has been switched to the charge control mode and charging with surplus power has been started, the first control circuit 144 in the first control section 14 confirms whether or not the storage battery 2 is in the charge control mode in S101 (see FIGS. 12 and 13). Then, after having confirmed that the storage battery 2 is in the charge control mode, the first control circuit 144 in the first control section 14 confirms charge power of the storage battery 2 in S103.

As a result of the confirmation, if the charge power is equal to or greater than an eleventh predetermined value, the subsequent processing from S104 is performed, thereby shifting to the MPPT control mode (the details will be described later). On the other hand, if the charge power is smaller than the eleventh predetermined value, whether or not the storage battery 2 is in the charge control mode and the charge power is smaller than a twelfth predetermined value is confirmed (S105).

If the storage battery 2 is in the charge control mode and the charge power is smaller than the twelfth predetermined value, for example, when power consumed by the load 4 in a home has increased (or the insolation amount has varied), generated power by the solar panel 1 cannot sufficiently cover the power consumed by the load 4 in a home. In this state, if power consumed by the load 4 has changed, the power conversion device 10 cannot follow this, so that the power conversion device 10 might stop.

In order to avoid this, in the present embodiment 3, the control mode is switched to the voltage control mode which can control generated power of the solar panel 1. As described above, generated power by the solar panel 1 decreases by the control for the solar panel 1 being switched from the MPPT control mode to the voltage control mode. As a result, the control mode for the storage battery 2 is switched from the charge control mode to the discharge control mode. In the present embodiment 3, the twelfth predetermined value is determined so as to cause the control mode for the storage battery 2 to be switched to the discharge control mode.

By thus performing control, in the case where the amount of surplus power is small, the control mode for the solar panel 1 is shifted to the voltage control mode, whereby the control mode for the storage battery 2 is consequently shifted to the discharge control mode. Therefore, an effect is provided that power can be stably supplied even if power used by the load 4 has increased suddenly.

In the case of continuing the control by the MPPT control mode without performing the above operation, if power of the load 4 has sharply increased, the power to be supplied to the load 4 cannot be covered by generated power of the solar panel 1, and therefore the storage battery 2 is shifted to the discharge mode. In the case of shifting the storage battery 2 to the discharge mode, the control for the solar panel 1 needs to be switched from the MPPT control mode to the voltage control mode once (the reason will be described later).

When the solar panel 1 has been shifted to the voltage control mode, generated power of the solar panel 1 further decreases, and power to be supplied to the load 4 in a home becomes further insufficient. When the solar panel 1 has been shifted to the voltage control mode, the storage battery 2 has been shifted from the charge control mode to the discharge control mode in accordance with the flow shown in S122 to S124 in FIG. 14 (the details of the shift procedure will be described later).

Shift from the charge control mode to the discharge control mode of the storage battery 2 takes time because the second DC/DC conversion circuit 17 is stopped and activated again. In this period, power for deficiency cannot be supplied to the load, and therefore such a problem that the power conversion device 10 stops or a part of the load stops, arises.

If the storage battery 2 is in the charge control mode and the charge power is smaller than the twelfth predetermined value in S105 in FIGS. 12 and 13, the first control circuit 144 in the first control section 14 confirms whether or not the present time is in a shift mask period to the voltage control mode in S112. If the present time is in the shift mask period, the first control circuit 144 confirms with the second control section 18 whether or not to switch charge/discharge control for the storage battery 2 in S113. If the charge/discharge control is not to be switched or if switching between charging and discharging is not being performed, the process returns to S21 while keeping the control for the solar panel 1 as the MPPT control mode.

On the other hand, if the present time is not in the shift mask period to the voltage control mode in S112 or if control for switching between charging and discharging of the storage battery 2 is being performed in S113, the control for the solar panel 1 is shifted from the MPPT control mode to the voltage control mode in S114. At the shifting to the voltage control mode, as shown in FIG. 11, the control for the solar panel 1 in the MPPT control mode is performed with lower voltage than the voltage control range in the voltage control mode. Therefore, at the start of the voltage control, DC bus voltage of the DC bus 25 is controlled to be lower limit voltage of the voltage control range shown in FIG. 11. Then, when voltage of the solar panel 1 has become the lower limit voltage, the second control circuit 184 starts control so that the DC bus voltage becomes the second control target voltage. It is noted that after the shift to the voltage control mode in S114, the first control circuit 144 in the first control section 14 changes a thirteenth predetermined value described later to a value used in the voltage control mode (S115), and then the process returns to S21.

On the other hand, if charge power of the storage battery 2 is equal to or greater than the eleventh predetermined value in S103 (see FIGS. 12 and 13), whether or not the control mode for the solar panel 1 is the MPPT control mode is confirmed in S104. If the control mode is the MPPT control mode, the above-described processing is performed in S105.

If the control mode is not the MPPT control mode, in the present embodiment 3, for shifting to the MPPT control mode, whether or not the insolation amount has sharply changed is confirmed in S106. If the insolation amount has sharply changed, it is impossible to perform control at an optimum control point (point at which generated power is maximized) even if the control mode is shifted to the MPPT control mode. Therefore, shift to the MPPT control mode is not performed until the sharp change in the insolation amount stabilizes, and the operation is continued in the voltage control mode (returns to S21).

On the other hand, if the insolation amount has not sharply changed, whether or not power consumed by the load 4 in a home has sharply changed is confirmed (S107). If power consumed by the load 4 in a home has sharply changed, particularly, if the power consumption has sharply increased, power to be supplied to the load 4 might not be covered by generated power of the solar panel 1. In this case, depending on the response performance of the solar panel 1, the control might not be able to follow the sharp change in the load and therefore the storage battery 2 might be switched from the charge control mode to the discharge control mode.

Therefore, in the case where power consumed by the load 4 in a home has sharply changed, the control mode is not shifted to the MPPT control mode until power consumed by the load 4 stabilizes, and the operation is continued in the voltage control mode (returns to S21). It is noted that in the case of switching the storage battery 2 from the charge control mode to the discharge control mode or from the discharge control mode to the charge control mode, it is necessary to control the solar panel 1 by the voltage control mode (the reason will be described later).

If power consumed by the load 4 has not sharply changed in S107 (see FIGS. 12 and 13), whether or not the present time is a timing of shifting to the MPPT control mode is confirmed in S108. Specifically, whether or not AC voltage outputted from the power conversion device 10 is close to a zero cross point is confirmed. This is because power consumed by the load 4 in a home when the AC voltage is close to a zero cross point is almost "0".

For example, when the control mode has been shifted to the MPPT control mode at a peak of AC voltage, power consumed by the load 4 in a home at this moment is the maximum. Therefore, great power is supplied from the power conversion device 10 to the load 4 in a home. As a result, DC bus voltage of the DC bus 25 decreases. Therefore, even if an instruction value outputted to the first DC/DC conversion circuit 13 is not changed, the DC bus voltage varies, so that the control point moves. This serves as disturbance at the start of the MPPT control, and prolongs a time taken from the start of the MPPT control until the control point reaches the maximum power point.

Therefore, in the present embodiment 3, switching to the MPPT control mode is performed in the vicinity of a zero cross point of the AC voltage. If the AC voltage is not close to a zero cross point, the control mode is not shifted to the MPPT control mode but the operation is continued in the voltage control mode (returns to S21).

If a zero cross point of the AC voltage has been detected in S108 (see FIGS. 12 and 13), the first control circuit 144 in the first control section 14 outputs a stop instruction to the voltage control circuit 142. Also, the first control circuit 144 confirms whether the previous control instruction value is outputted in a direction to increase the DC bus voltage or in a direction to decrease the DC bus voltage. After having acquired information about the previous instruction value, the first control circuit 144 issues an activation instruction and reports the acquired instruction value information, to the MPPT control circuit 141 (S109). At this time, the first control circuit 144 instructs the switch circuit 143 to select output of the MPPT control circuit 141.

When having received the activation instruction, the MPPT control circuit 141 determines the direction for moving the instruction value in MPPT control, based on the instruction value information inputted from the first control circuit 144 and the previously measured generated power and the present generated power of the solar panel 1.

Meanwhile, the first control circuit 144 sets a shift mask counter provided therein (not shown) for masking shift to voltage control during a certain period in S110. The reason is as follows.

When the control mode has been shifted from the voltage control mode to the MPPT mode, as shown in FIG. 15(*c*), the second DC/DC conversion section 17 which drives the storage battery 2 becomes the main section for controlling DC bus voltage of the DC bus 25. As shown in a period B in FIG. 15(*c*), DC bus voltage decreases toward the voltage control target value for the storage battery 2. At this time, generated power of the solar panel 1 may decrease just after the shift to the MPPT control mode (see a solid-line waveform in FIG. 16(*a*)).

In embodiment 3, the case where the generated power decreases just after shift to the MPPT control mode is shown. This occurs for the following reason.

As shown in FIG. 15(*c*), since the DC bus voltage decreases, even in the case of the same instruction value, generated power of the solar panel 1 varies. Basically, voltage of the solar panel 1 decreases, and therefore the generated power increases. At this time, originally, it is necessary to issue an instruction value in a direction to decrease the voltage as shown in FIG. 11 just after the control has been switched from voltage control to MPPT control.

However, in the case where an instruction value of the MPPT control circuit 141 has been moved in a direction to increase voltage of the solar panel 1, at the next control, the MPPT control circuit 141 outputs an instruction value in a direction to further increase voltage of the solar panel 1. This serves as disturbance at the start of MPPT control, and is a reason why the generated power decreases once just after shift to the MPPT control mode. It is noted that a dashed line in FIG. 16(*a*) indicates power consumed by the load 4.

Since generated power of the solar panel 1 decreases just after shift to the MPPT control mode as described above, charge power to charge the storage battery 2 decreases as shown in a period B in FIG. 16(*b*). In the present embodiment 3, for the above-described reason, even in the case where the storage battery 2 is in the charge control mode, if charge power to the storage battery 2 is smaller than the twelfth predetermined value, the control for the solar panel 1 is shifted to the voltage control mode (see S105 in FIGS. 12 and 13).

However, as described above, generated power of the solar panel 1 may temporarily decrease just after switching to the MPPT control mode, and therefore charge power to the storage battery 2 may become smaller than the twelfth predetermined value. At this time, if the control for the solar panel 1 is switched from the MPPT control mode to the voltage control mode, the storage battery 2 is also shifted to the discharge control mode, as described above.

At this time, in the case where power consumed by the load 4 and the insolation amount have hardly changed, when the voltage control for the solar panel 1 has converged, DC bus voltage of the DC bus 25 becomes greater than the third threshold value, and the storage battery 2 is switched to the charge control mode again (see S12 and S125 in FIG. 14). Then, the control for the solar panel 1 is switched to the MPPT control mode again.

As described above, unless a predetermined period for inhibiting (masking) shift of the solar panel 1 to the voltage control mode is provided, hunting occurs in the control for the storage battery 2 and the control for the solar panel 1 in the power conversion device 10. Therefore, in the present embodiment 3, the predetermined period for inhibiting shift of the solar panel 1 to the voltage control mode is provided, whereby the above-described hunting in the control is suppressed.

After the shift mask counter for shift to voltage control has been set and activated in S110 (FIGS. 12 and 13), the first control circuit 144 in the first control section 14 changes the thirteenth predetermined value described later to the predetermined value for the MPPT control mode (S111).

If charge power is smaller than the eleventh predetermined value in S103 (see FIGS. 12 and 13), the first control circuit 144 in the first control section 14 confirms whether or not the storage battery 2 is in the charge mode and charge power to the storage battery 2 is smaller than the twelfth predetermined value, in S105. As a result of the confirmation, if the storage battery 2 is in the discharge mode or the charge power is equal to or greater than the twelfth predetermined value, the process returns to S21, to continue the control for the solar panel 1.

On the other hand, if the storage battery 2 is in the charge mode and charge power is smaller than the twelfth predetermined value, whether or not the present time is in the above-described period for masking shift of the solar panel 1 to the voltage control is confirmed in S112. As a result of the confirmation, if the present time is in the period for masking, the first control circuit 144 in the first control section 14 confirms whether or not switching of the control mode between charging and discharging of the storage battery 2 is being performed in S113.

The reason why charge/discharge control switching for the storage battery 2 is confirmed in the control for the solar panel 1 is as follows. In the present embodiment 3, in the case of switching the charge/discharge control mode for the storage battery 2, operation of the second DC/DC conversion circuit 17 is stopped once. Therefore, if the control mode for the solar panel 1 is MPPT control, DC voltage of the DC bus 25 is not controlled during the period in which the second DC/DC conversion circuit 17 is stopped.

Figure 17:
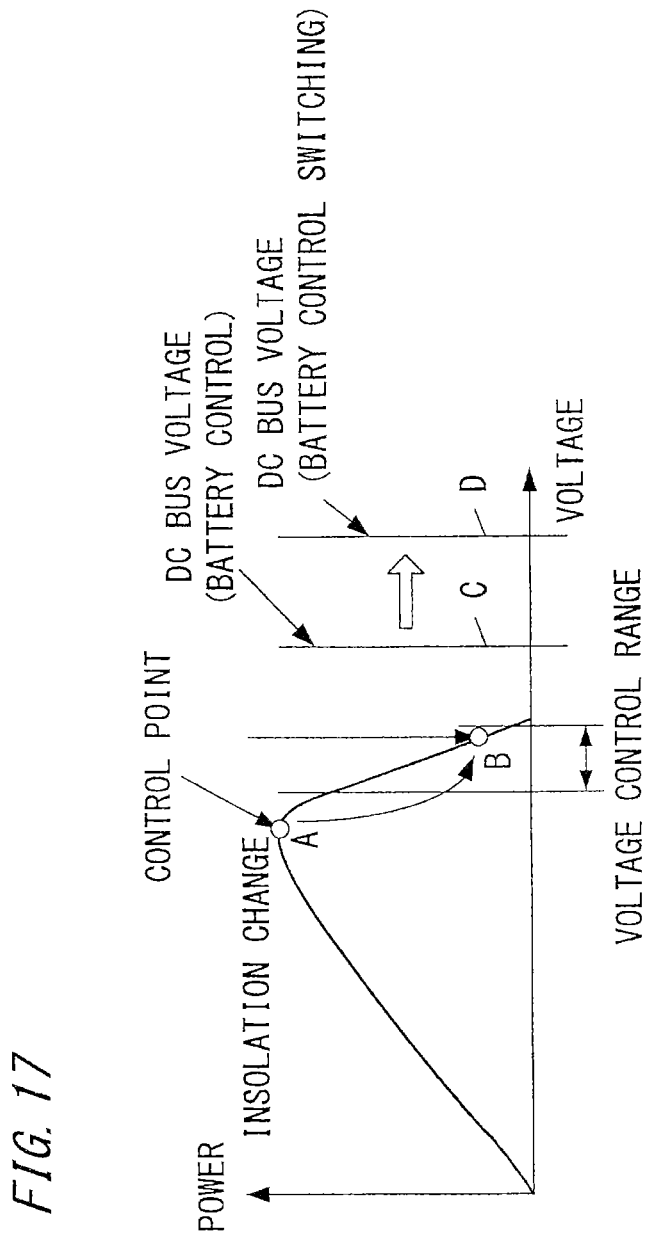
FIG. 17 is an operation explanation diagram for schematically explaining operation of the power conversion device in the case of power outage according to embodiment 3 of the present invention.

If DC voltage of the DC bus 25 is not controlled, as shown in FIG. 17, the capacitor (not shown) connected to the DC bus 25 is charged with power generated by the solar panel 1, so that the DC bus voltage increases. In FIG. 17, the DC bus voltage increases from C to D.

On the other hand, in the first DC/DC conversion circuit 13, panel voltage of the solar panel 1 is controlled based on a control instruction value (step-up ratio) outputted from the first control section 14 and the DC bus voltage. Therefore, even if the control instruction value (step-up ratio) is not changed, since the DC bus voltage increases, the operation point (control point) of the solar panel 1 moves from a point A to a point B.

For example, in the case where the DC bus voltage is controlled at 350V and operation voltage at the control point A is 200V, the control instruction value is 200/350=0.57.

Then, if the DC bus voltage increases to 400V for the above reason, in the case of the same instruction value, operation voltage of the solar panel 1 is 400×0.57=228V (control point B).

As shown in FIG. 17, if voltage of the solar panel 1 increases beyond the optimum control point, the generated power remarkably decreases. Therefore, when the control for the storage battery 2 is switched, if the control for the solar panel 1 has been continued in the MPPT control mode, the control point moves to B in FIG. 17 and generated power of the solar panel 1 remarkably decreases. Therefore, power supplied to the load 4 in a home becomes insufficient, so that the load 4 stops.

Therefore, in the present embodiment 3, as shown in timing charts in FIGS. 15 and 16, for switching of the control mode for the storage battery 2 (at period A part and period C part), control is performed such that the control mode for the storage battery 2 is switched after the control for the solar panel 1 is switched to the voltage control mode, thereby solving the above problem.

If switching of charge/discharge control for the storage battery 2 is being performed in S113 in FIGS. 12 and 13, the first control circuit 144 in the first control section 14 forcibly switches the control for the solar panel 1 to the voltage control mode, even in the shift mask period to voltage control (S114). After the control for the solar panel 1 has been switched to the voltage control mode in S114, the first control circuit 144 changes the thirteenth predetermined value described later to a value used in voltage control.

Hereinafter, with reference to FIG. 18, a control method for switching between the MPPT control mode and the voltage control mode, performed by using the thirteenth predetermined value will be described. It is noted that the thirteenth predetermined value is a first predetermined value of the present invention.

In the present embodiment 3, the thirteenth predetermined value is set as follows.

Thirteenth predetermined value (in voltage control mode) >Thirteenth predetermined value (in MPPT control mode)

Normally, when the control mode has been switched from the voltage control mode to the MPPT control mode, surplus power is generated. Therefore, discharge power from the storage battery 2 decreases. At this time, in the state where the discharge power from the storage battery 2 is small, if the control for the solar panel 1 has been switched from the voltage control mode to the MPPT control mode, generated power in the MPPT control mode becomes greater than power consumed by the load 4, so that surplus power is generated. Therefore, the storage battery 2 is switched from the discharge control mode to the charge control mode.

However, originally, the storage battery 2 also discharges power slightly. Therefore, at the time of switching for the solar panel 1, basically, the solar panel 1 generates the maximum power that can be generated in the voltage control mode. Therefore, in the case where power consumed by the load 4 and the insolation amount do not change, charge power (surplus power) for the storage battery 2 is represented as follows.

Generated Power in MPPT Control Mode—Generated Power in Voltage Control Mode—Discharge Power For example, in the case where the difference between generated power in the MPPT control mode and generated power in the voltage control mode is about 250 W and discharge power is about 200 W, if the storage battery 2 is switched to the charge control mode, the storage battery 2 is charged with surplus power of 50 W.

Here, with regard to power consumed by the load 4 in a home, for example, in the case where an inverter apparatus (in which power consumption periodically increases in a short time) operates and power of about 100 W is consumed during several seconds even though the average power consumption is smaller than 50 W, surplus power to be supplied to the storage battery 2 disappears, so that the storage battery 2 is switched to the discharge control mode again.

Then, when power consumed by the load 4 in a home has returned to the original state, surplus power is generated again, so that the storage battery 2 is switched to the voltage control mode again. Then, during ten and several seconds, when power consumed by the load 4 in a home becomes about 20 W, the control mode for the solar panel 1 is switched to the MPPT control mode again and the storage battery 2 is switched to the charge control mode again.

As described above, in the state where discharge power of the storage battery 2 is small, if the control for the solar panel 1 is shifted to the MPPT control mode, the storage battery 2 is alternately switched between the charge control mode and the discharge control mode (hunting occurs).

Therefore, in the present embodiment 3, in order to suppress the above hunting, the thirteenth predetermined value in the voltage control is determined such that shift to the MPPT control mode is performed when, at least, there is discharge power so sufficient that even if the solar panel 1 is switched to the MPPT control mode, the control mode for the storage battery 2 can be kept in the discharge control mode.

Specifically, from the maximum power that can be generated in the MPPT control mode, estimated in embodiment 2, the maximum power that can be generated in the voltage control mode, estimated in the same manner is subtracted, and then offset power for preventing hunting is added to the differential value. The value thus obtained is set as the thirteenth predetermined value (for example, 250 W+150 W=400 W).

On the other hand, once the control mode has been switched to the MPPT control mode, in order to use generated power by the solar panel 1 as effectively as possible, in embodiment 3, hysteresis is provided for a condition for shifting to the voltage control mode.

Figure 18:
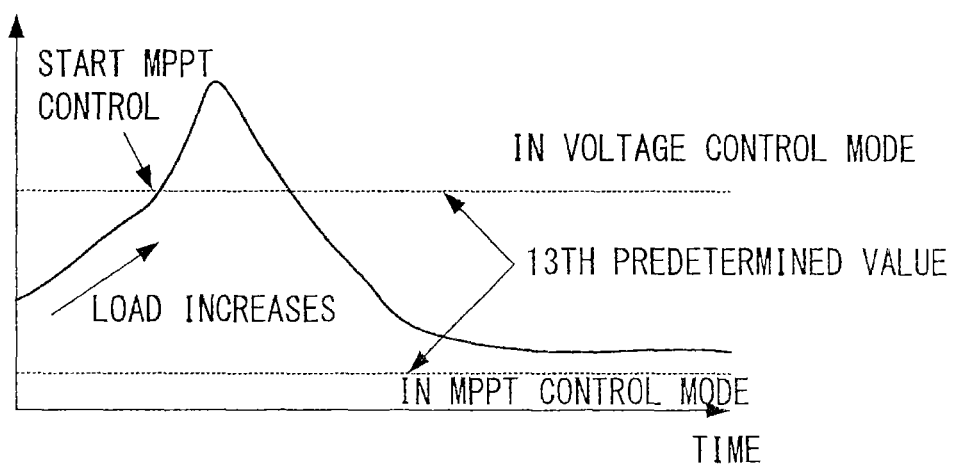
FIG. 18 is an operation explanation diagram for schematically explaining operation of the power conversion device in the case of power outage according to embodiment 3 of the present invention.

Specifically, as shown in FIG. 18, after shift to the MPPT control mode, the thirteenth predetermined value is changed to a value used in the MPPT control mode, in S111 (see FIGS. 12 and 13). On the other hand, after shift to the voltage control mode, the thirteenth predetermined value is changed to a value used in the voltage control, in S115.

For example, if the thirteenth predetermined value in the voltage control mode is set at about 400 W, the thirteenth predetermined value in the MPPT control mode is set at about 50 W.

The reason will be described below. In the case where the same thirteenth predetermined value is used in both the voltage control mode and the MPPT control mode, since generated power from the solar panel 1 increases by shift to the MPPT control mode, if power consumed by the load 4 and the insolation amount do not change, discharge power from the storage battery 2 decreases by an amount corresponding to the increase in generated power by the solar panel 1. Therefore, discharge power becomes smaller than the thirteenth predetermined value in S102 (see FIGS. 12 and 13). Therefore, the process proceeds to S116.

Then, in S116, the DC bus voltage is compared with the eleventh threshold value. Normally, the eleventh threshold value is set to be smaller than the control target value for the storage battery 2. Then, for example, in such a case where power consumed by the load 4 has momentarily increased, response of the second DC/DC conversion circuit 17 cannot follow the increase, and therefore DC bus voltage of the DC bus 25 may become greater than the eleventh threshold value. At this time, the process proceeds from S116 to S112, so that the control for the solar panel 1 is shifted from MPPT control to voltage control again.

On the other hand, in the case where the thirteenth predetermined value is decreased, discharge power becomes equal to or greater than the thirteenth predetermined value (for example, 400 W−250 W=150 W) in S102. Therefore, even if power consumed by the load 4 has momentarily increased, the control mode is not immediately shifted to the voltage control mode, and the MPPT control mode can be continued. Thus, the above hunting can be prevented, and unnecessary switching of the control mode for the solar panel 1 does not occur. Therefore, an effect is provided that generated power of the solar panel 1 can be used maximally.

If the storage battery 2 is in the discharge control mode in S101 (see FIGS. 12 and 13), the first control circuit 144 in the first control section 14 confirms discharge power of the storage battery 2 in S102. As a result of the confirmation, if the discharge power is equal to or greater than the thirteenth predetermined value, the process proceeds to S104, and then, in the case of MPPT control mode, the process returns to S21 via S105. As described above, the thirteenth predetermined value differs between the MPPT control mode and the voltage control mode.

On the other hand, if the discharge power is smaller than the thirteenth predetermined value in S102, the DC bus voltage is confirmed in S116. As a result of the confirmation, if the DC bus voltage is equal to or smaller than the eleventh threshold value, the process returns to S21. On the other hand, if the DC bus voltage is greater than the eleventh threshold value, it is determined that generated power by the solar panel 1 is great, and the process proceeds to S112 to shift the control for the solar panel 1 to the voltage control mode in accordance with the flows shown in FIGS. 12 and 13.

By thus performing control, an effect is provided that shift of the storage battery 2 to the charge control mode can be performed smoothly.

This is because, as described above, for control mode shift of the storage battery 2, it is necessary to shift the solar panel 1 to the voltage control mode.

In FIG. 16(*a*), when power consumed by the load 4 increases (part X), charge power of the storage battery 2 decreases (see FIG. 16(*b*)). Along with this, the DC bus voltage decreases. If the DC bus voltage is smaller than third threshold value in S12 (see FIG. 14), the second control circuit 184 in the second control section 18 compares the DC bus voltage with the fourth threshold value in S14.

If the DC bus voltage is greater than the fourth threshold value in S14, it is determined that power is sufficiently supplied to the load 4. Therefore, the previous control (present control) is continued (S15) and the process returns to S12. On the other hand, if the DC bus voltage is equal to or smaller than the fourth threshold value in S14, the control mode for the storage battery 2 is confirmed in S121.

If the control mode is the discharge mode in S121, the previous control (present control) is continued (S15) and the process returns to S12. If the control mode is the charge mode in S121, the second control circuit 184 in the second control section 18 switches the control mode for the storage battery 2 from the charge control mode to the discharge control mode.

For the switching, the second control circuit 184 in the second control section 18 confirms the control mode for the solar panel 1 with the first control section 14. If the control mode is the MPPT control mode, the second control circuit 184 reports the first control section 14 that the control mode for the storage battery 2 is to be switched. When having received the control mode switching information about the storage battery 2, the first control section 14 switches the control from the MPPT control mode to the voltage control mode.

Then, after having completed the switching to the voltage control mode, the first control section 14 reports the second control circuit 184 in the second control section 18 that the switching to the voltage control mode has been completed. When having received the report that the switching to the voltage control mode has been completed from the first control section 14, the second control circuit 184 stops the second DC/DC conversion circuit 17 once in S122. Then, when having confirmed that the second DC/DC conversion circuit 17 has been stopped, the second control circuit 184 instructs the second DC/DC conversion circuit 17, the charge control circuit 181, and the discharge control circuit 182 to initialize registers and various kinds of variables (parameters) in S123.

It is noted that in the present embodiment 3, the stoppage of the second DC/DC conversion circuit 17 is confirmed by confirmation that the absolute value of current outputted from the ammeter 16 has become smaller than a predetermined value.

After having completed the initialization instruction, the second control circuit 184 outputs an activation instruction to the discharge control circuit 182, and instructs the switch circuit 183 to select output of the discharge control circuit 182 (S124). After the activation by the discharge control mode has been completed in S124, the process returns to S12 to continue the control for the storage battery 2.

In the above description of embodiment 3, whether or not discharge power is equal to or greater than the thirteenth predetermined value is determined in S102 in FIGS. 12 and 13. If the discharge power is equal to or greater than the thirteenth predetermined value, the insolation amount and the status of the load are confirmed, and then the control mode is shifted to the MPPT control mode. On the other hand, if the discharge power is smaller than the thirteenth predetermined value in S102, the bus voltage is confirmed and then the control mode is shifted to the voltage control mode.

Instead, control may be performed such that if the discharge power is equal to or greater than the thirteenth predetermined value, the control mode is shifted to the MPPT control mode, and if the discharge power is smaller than the thirteenth predetermined value, the control mode is shifted to the voltage control mode. Thus, the control processing can be simplified without losing the effect of suppressing hunting behavior between the voltage control mode and the MPPT mode.

As described above, in the power conversion device 10 of the present embodiment 3, in the case where the power system 3 is in a power outage state, the control mode for the solar panel 1 is switched between the MPPT control mode and the voltage control mode, based on the control mode or discharge power of the storage battery 2, whereby an effect is provided that generated power by the solar panel 1 can be maximally and efficiently derived and effectively used. At this time, the thirteenth predetermined value for discharge power, which serves as a condition for determining whether or not to switch the control mode from the voltage control mode to the MPPT control mode, is set to be different between these control modes, whereby hysteresis is provided for a condition for switching the voltage control mode.

Thus, hunting behavior that the control mode is repeatedly switched in switching of the solar panel 1 can be suppressed, thereby providing an effect of solving a problem that occurrence of hunting prevents maximum usage of generated power of the solar panel 1.

In addition, in the control mode switching in the case of power outage, as described above, generated power of the solar panel 1 may temporarily decrease. At this time, if the storage battery 2 has been operating in the charge control mode, power supplied to the load 4 temporarily decreases and thereby DC bus voltage of the DC bus 25 decreases. By masking the shift, switching from the power control mode to the voltage control mode can be inhibited during a predetermined period. Therefore, unnecessary shift of the control mode for the solar panel 1 can be suppressed, thus providing an effect of preventing hunting in which the control mode is repeatedly switched.

In the present embodiment 3, the case where masking of the control mode is applied to only the control for the solar panel 1 has been described. However, control may be performed such that shift of the control mode for the storage battery 2 is also masked during the mask period, whereby the same effect is provided.

It is noted that, in the case of employing this mask control for the storage battery 2, since it is necessary to switch the control mode from the charge control mode to the discharge control mode when power supplied to the load 4 has become insufficient due to sharp change in the load, the fourth threshold value in S14 in FIG. 14 is switched depending on whether the present time is in the control switching mask period for the solar panel 1 or a normal period.

It is noted that if the fourth threshold value during the control switching mask period is set to be smaller than in the other period, it is also possible to suppress unnecessary switching of the control mode for the storage battery 2.

In the present embodiment 3, the switching mask period is set only for switching control for the solar panel 1 in the case of power outage. However, the present invention is not limited thereto. During a certain period just after control mode switching of the storage battery 2, shift of the control mode for the storage battery may be masked, whereby unnecessary shift of the control mode for the storage battery 2 can be suppressed.

For shifting the control mode for the storage battery 2, as described above, it is necessary to switch the control mode for the solar panel 1 to the voltage control mode. Therefore, by suppressing unnecessary shift of the control mode for the storage battery 2, shift of the control mode for the solar panel 1 can also be suppressed, whereby an effect is provided that power generation capacity of the solar panel 1 can be maximally used and operation duration time in self-sustained operation in the case of power outage can be prolonged. It is noted that if control is performed such that control mode shift of the solar panel 1 is suppressed during the control mode shift mask period for the storage battery 2, unnecessary shift (solar panel control and storage battery control) of the control mode can be suppressed.

In addition, it is necessary to cope with the case where, during the control mode shift mask period for the storage battery 2, power consumed by the load 4 sharply changes, or the insolation amount sharply changes and generated power of the solar panel 1 sharply changes. Therefore, in the control for the storage battery 2, instead of perfect masking, the third threshold value in S12 and the fourth threshold value in S14 in FIG. 14 are each switched depending on whether the present time is in the mask period or the other period, whereby it becomes possible to cope with sharp change in the load or the insolation amount.

In addition, in the present embodiment 3, for control mode switching of the storage battery 2 in the case of power outage, the control mode for the solar panel 1 is switched to the voltage control, and thereafter, the control mode for the storage battery 2 is switched. Therefore, DC bus voltage of the DC bus 25 can be managed also at the time of the control mode switching for the storage battery 2. Therefore, an effect is provided that the DC bus voltage can be prevented from becoming unexpected voltage at the time of the control switching.

Thus, it becomes possible to suppress large variation in panel voltage of the solar panel 1 at the time of the control mode switching for the storage battery 2 (see FIG. 17), thereby providing an effect that the power conversion device 10 can be stably operated.

It is noted that, within the scope of the present invention, the above embodiments may be freely combined with each other, or each of the above embodiments may be modified or abbreviated as appropriate.

INDUSTRIAL APPLICABILITY

The present invention relates to a power conversion device that can efficiently obtain power from a solar battery and effectively use the generated power in the case of power outage, and is applicable to a wide variety of controls of a distributed power supply.

The invention claimed is:

1. A power conversion device for converting DC power from a distributed power supply and supplying the converted power to a power system and a load, the power conversion device comprising:
a first DC/DC conversion circuit that converts a first DC voltage outputted from the distributed power supply to a second DC voltage;

a DC/AC conversion circuit connected to the first DC/DC conversion circuit via positive and negative DC buses and that converts DC voltage to a desired AC voltage and outputs the desired AC voltage to the power system and the load;

a second DC/DC conversion circuit that controls a bus voltage between the DC buses at least in a self-sustained operation when power from the power system is not available, the second DC/DC conversion circuit being connected to a power accumulator that is charged and discharged by the second DC/DC conversion circuit based on an operation of the power conversion device;

a bus voltage meter that measures the bus voltage;

a first controller that drive-controls the first DC/DC conversion circuit, the first controller having two control modes including a power control mode for deriving the maximum power of the distributed power supply and a voltage control mode for controlling bus voltage between the DC buses;

a second controller that drive-controls the second DC/DC conversion circuit; and a third controller that drive-controls the DC/AC conversion circuit, wherein the second controller drive-controls the second DC/DC conversion circuit, based on a measured value of the bus voltage measured by the bus voltage meter, to control the bus voltage, in the self-sustained operation, the first controller switches the two control modes, based on a measured value of the bus voltage measured by the bus voltage meter, in the self-sustained operation, and the third controller measures voltage and current output by the power system to determine whether to enter self-sustained operation.

2. The power conversion device according to claim 1, wherein the second controller, based on a measured value of the bus voltage measured by the bus voltage meter, controls output voltage from the second DC/DC conversion circuit, to control the bus voltage, in the self-sustained operation, and the control information of the second controller for switching the two control modes is a measured value of the bus voltage measured by the bus voltage meter.

3. The power conversion device according to claim 2, wherein a control target voltage of the bus voltage for the first DC/DC conversion circuit is set in the voltage control mode for the distributed power supply in the self-sustained operation, and if the measured value of the bus voltage is equal to or smaller than a first, threshold value which is smaller than the control target voltage, the first controller selects the power control mode, and if the measured value of the bus voltage is equal to or greater than a second threshold value which is greater than the control target voltage, the first controller selects the voltage control mode.

4. The power conversion device according to claim 3, wherein if the measured value of the bus voltage is equal to or smaller than a predetermined threshold value, the second controller starts discharge control for the power accumulator by the second DC/DC conversion circuit, and the first threshold value is set to be smaller than the predetermined threshold value.

5. The power conversion device according to claim 2, wherein the control information of the second controller circuit for switching the two control modes is charge/discharge control information of the power accumulator.

6. The power conversion device according to claim 5, wherein switching of charge/discharge control for the power accumulator is performed based on an estimated value of surplus power that can be generated by the distributed power supply.

7. The power conversion device according to claim 1, wherein the second DC/DC conversion circuit includes a power meter that measures a charge/discharge power of the power accumulator, and the first controller performs control to, if the power accumulator is in a charged state, or if the power accumulator is in a discharging state and a discharge power outputted from the power meter is equal to or greater than a first predetermined value, switch control for the first DC/DC conversion circuit to the power control mode, and if the power accumulator is in a discharging state and the discharge power outputted from the power meter is smaller than the first predetermined value, switch control for the first DC/DC conversion circuit to the voltage control mode.

8. The power conversion device according to claim 7, wherein in the case of switching the control from the power control mode to the voltage control mode by the first controller, the switching is controlled to be inhibited during a predetermined period.

9. The power conversion device according to claim 7, wherein the first predetermined value for switching a control method by the first controller when control is performed in the voltage control mode is greater than when control is performed in the power control mode.

10. The power conversion device according to claim 7, wherein in the case of switching the power accumulator from charging to discharging or from discharging to charging, the first controller forcibly switches the control to the voltage control mode.

11. The power conversion device according to claim 1, wherein the power accumulator is a storage battery.

12. The power conversion device according to claim 1, wherein the voltage control mode further includes setting a voltage control range at a higher voltage than a voltage corresponding to a maximum power point of a power-voltage characteristic of the distributed power supply.

* * * * *